US010229773B2

(12) United States Patent
Wang et al.

(10) Patent No.: US 10,229,773 B2
(45) Date of Patent: Mar. 12, 2019

(54) ACOUSTO-OPTIC AUDIO SIGNAL CABLE

(71) Applicants: Shenzhen ZhuiGuang Electronic Technology co., ltd, Shenzhen (CN); Calvin Shie-Ning Wang, Los Angeles, CA (US)

(72) Inventors: Calvin Shie-Ning Wang, Los Angeles, CA (US); Zheng-Kai Yin, Shenzhen (CN)

(73) Assignees: SHENZHEN ZHUIGUANG ELECTRONIC TECHNOL, Shenzhen (CN); Calvin Shie-Ning Wang, Los Angeles, CA (US)

( * ) Notice: Subject to any disclaimer, the term of this patent is extended or adjusted under 35 U.S.C. 154(b) by 363 days.

(21) Appl. No.: 15/255,149

(22) Filed: Sep. 2, 2016

(65) Prior Publication Data

US 2017/0211803 A1    Jul. 27, 2017

(30) Foreign Application Priority Data

Jan. 21, 2016  (CN) .......................... 2016 1 0040380
Jan. 21, 2016  (CN) ..................... 2016 2 0058755 U

(51) Int. Cl.
*F21V 33/00*   (2006.01)
*F21V 23/00*   (2015.01)
(Continued)

(52) U.S. Cl.
CPC .............. *H01B 11/125* (2013.01); *F21S 4/10* (2016.01); *F21S 4/22* (2016.01); *F21S 4/26* (2016.01); *F21V 19/02* (2013.01); *F21V 23/001* (2013.01); *F21V 23/005* (2013.01); *F21V 23/06* (2013.01); *F21V 33/0056* (2013.01); *G02F 1/113* (2013.01); *H05B 33/0806* (2013.01);
(Continued)

(58) Field of Classification Search
CPC ... H01B 11/125; F21S 4/10; F21S 4/22; F21S 4/26; F21V 19/02; F21V 23/001; F21V 23/005; F21V 23/06; F21V 33/0056; G02F 1/113; H05B 33/0806; H05B 33/0842; H05B 37/0236
USPC .......................................... 362/157; 174/135
See application file for complete search history.

(56) References Cited

U.S. PATENT DOCUMENTS

2015/0184808 A1* 7/2015 Wang .................... F21V 23/009
                                                    362/235
2015/0373449 A1* 12/2015 Jackson ............... H04R 1/1033
                                                    381/74

* cited by examiner

*Primary Examiner* — Timothy J Thompson
*Assistant Examiner* — Charles Pizzuto
(74) *Attorney, Agent, or Firm* — Chieh-Mei Wang

(57) ABSTRACT

An acousto-optic audio signal cable includes an audio wire cluster, a light emitting diode marquee light wire or a light emitting diodes light-emitting light string or an electroluminescent cable, a transparent or light-transmitting insulating layer, and an acousto-optic controller. The light emitting diode marquee light wire and the audio wire cluster, or the light emitting diodes light-emitting light string and the audio wire cluster, or the electroluminescent cable and the audio wire cluster are integrated into a wire cluster. The transparent or light-transmitting insulating layer wraps the integrated wire cluster. The acousto-optic controller includes a sampling amplifier circuit component, an A/D conversion circuit component, a microprocessor, and an output driver coupled in sequence. An input terminal of the sampling amplifier circuit component is coupled to the audio wire cluster. The output driver is coupled to the light emitting diode marquee light wire.

20 Claims, 19 Drawing Sheets

(51) Int. Cl.
*F21S 4/10* (2016.01)
*F21S 9/02* (2006.01)
*F21V 19/02* (2006.01)
*F21V 23/06* (2006.01)
*H05B 37/02* (2006.01)
*H01B 11/12* (2006.01)
*H05B 33/08* (2006.01)
*F21S 4/22* (2016.01)
*F21S 4/26* (2016.01)
*G02F 1/11* (2006.01)
*F21Y 115/10* (2016.01)
*F21L 4/00* (2006.01)
*F21W 131/30* (2006.01)

(52) U.S. Cl.
CPC ..... *H05B 33/0842* (2013.01); *H05B 37/0236* (2013.01); *F21L 4/00* (2013.01); *F21S 9/02* (2013.01); *F21W 2131/30* (2013.01); *F21Y 2115/10* (2016.08); *H01B 11/12* (2013.01)

ACOUSTO-OPTIC AUDIO SIGNAL CABLE

FIELD

The subject matter herein generally relates to audio signal cables, and, in particular embodiments, to an electric guitar cable, or a microphone cable, a speaker cable, or an earphone cable being illuminated in time to music.

BACKGROUND

Electric guitar cables, microphone cables, speaker cables, and earphone cables are audio signal cables wrapped in black sheath, gray sheath, or white sheath. Appearance of the audio signal cables are austere and monotonous, and conflict with the lively, boisterous, and fashionable atmosphere at social events. An audio signal cable lighting up with the music would be an enhancement.

SUMMARY OF THE INVENTION

The object is to provide an electric guitar cable and guitar strap, a microphone cable, a speaker cable, or an earphone cable being visually active with simple construction and operational convenience and having special function which is capable of synchronous producing regular flashes of light or a steady light display according to sound and rhythm of playing speaking, or singing.

Another object of the present disclosure is to provide an acousto-optic audio signal cable which includes at least one audio wire cluster, at least one light emitting diode (LED) marquee light wire or at least one light emitting diodes light-emitting light string, at least one transparent or light-transmitting insulating layer, and an acousto-optic controller. The at least one light emitting diode marquee light wire or the at least one light emitting diodes light-emitting light string is parallelly arranged at a side of the at least one audio wire cluster, or the at least one light emitting diode marquee light wire or the at least one light emitting diodes light-emitting light string is wound in a spiral on an outer surface of the at least one audio wire cluster. The at least one light emitting diode marquee light wire and the at least one audio wire cluster, or the at least one light emitting diodes light-emitting light string and the at least one audio wire cluster, are integrated into at least one wire cluster which is wrapped in the at least one transparent or light-transmitting insulating layer.

An embodiment of a detail construction of the acousto-optic audio signal cable is provided. The acousto-optic audio signal cable includes at least one audio wire cluster, at least one light emitting diode (LED) marquee light wire or at least one light emitting diodes light-emitting light string, at least one transparent or light-transmitting insulating layer, and an acousto-optic controller. The at least one light emitting diode marquee light wire or the at least one light emitting diodes light-emitting light string is parallelly arranged at a side of the at least one audio wire cluster, or the at least one light emitting diode marquee light wire or the at least one light emitting diodes light-emitting light string is wound in a spiral on an outer surface of the at least one audio wire cluster. The at least one light emitting diode marquee light wire and the at least one audio wire cluster, or the at least one light emitting diodes light-emitting light string and the at least one audio wire cluster, are integrated into at least one wire cluster which is wrapped in the at least one transparent or light-transmitting insulating layer. The acousto-optic controller includes a sampling amplifier circuit component, an A/D conversion circuit component, a microprocessor, and an output driver coupled in sequence. The sampling amplifier circuit component is coupled to the at least one audio wire cluster, and the output driver is coupled to the at least one light emitting diode marquee light wire to drive the at least one light emitting diode marquee light wire or the at least one light emitting diodes light-emitting light string.

Another embodiment of a detail construction of the acousto-optic audio signal cable is provided. The acousto-optic audio signal cable includes at least one audio wire cluster, at least one light emitting diode (LED) marquee light wire or at least one light emitting diodes light-emitting light string, at least one transparent or light-transmitting insulating layer, and an acousto-optic controller. The at least one light emitting diode marquee light wire or the at least one light emitting diodes light-emitting light string is parallelly arranged at a side of the at least one audio wire cluster, or the at least one light emitting diode marquee light wire or the at least one light emitting diodes light-emitting light string is wound in a spiral on an outer surface of the at least one audio wire cluster. The at least one light emitting diode marquee light wire and the at least one audio wire cluster, or the at least one light emitting diodes light-emitting light string and the at least one audio wire cluster, are integrated into at least one wire cluster which is wrapped in the at least one transparent or light-transmitting insulating layer. The acousto-optic controller includes a bluetooth transmit-receive circuit, a D/A conversion circuit component, a microprocessor, and an output driver. The bluetooth transmit-receive circuit, the microprocessor, and the output driver are coupled in sequence. The output driver is coupled to the at least one light emitting diode marquee light wire or the at least one light emitting diodes light-emitting light string.

Another object of the present disclosure is to provide an acousto-optic audio signal cable which includes an audio wire cluster, at least one electroluminescent cable, a transparent or light-transmitting insulating layer, and an acousto-optic controller. The audio wire cluster and the at least one electroluminescent cable are parallelly with each other and integrated into an integrated wire cluster, or the audio wire cluster is arranged on a central axis of the at least one electroluminescent cable and integrates with the at least one electroluminescent cable to an integrated wire cluster. The integrated wire cluster is wrapped in the transparent or light-transmitting insulating layer. The acousto-optic controller includes a sampling amplifier circuit component, an A/D conversion circuit component, a microprocessor, and an output driver coupled in sequence. The sampling amplifier circuit component is coupled to the at least one audio wire cluster, and the output driver is coupled to the at least one electroluminescent cable.

A high-fashion and visually active acousto-optic audio signal cable is thus provided, with simple construction and operational convenience.

In accordance with a preferred embodiment of the invention, the audio wire cluster includes a number of signal conductors and a ground conductor. If the audio wire cluster is a dual track audio wire cluster or a multi track audio wire cluster, the audio wire cluster includes at least one left channel signal conductor, at least one right channel signal conductor, and at least one ground conductor. Each conductor includes a number of low impedance and shielded high conductivity wires. To increase an anti-interference ability of each wire, a metal woven mesh shield layer or an aluminum foil shield layer is wrapped over the circular or the elliptical audio wire cluster constituted by the signal conductors and the ground conductor.

In accordance with a preferred embodiment of the invention, a positive copper wire, a negative copper wire, and a group of surface mount light emitting diodes conductively attached between the positive copper wire and the negative copper wire forms a light emitting diodes light-emitting light string. The surface mount light emitting diodes are coupled in series or in parallel.

The positive copper wire and the negative copper wire are respectively coupled to the positive output terminal of the output driver and the negative output terminals of the output driver. The positive copper wire includes a first end and a second end. The first end of the positive copper wire is coupled to positive output terminal of the output driver, and the second end of the positive copper wire extends along the at least one audio wire cluster. The negative copper wire includes a first end and a second end. The first end of the negative copper wire is coupled to negative output terminal of the output driver, and the second end of the negative copper wire extends along the at least one audio wire cluster. One positive copper wire and one adjacent negative copper wire form a loop with one group of surface mount light emitting diodes parallelly conductively attached between the adjacent positive copper wire and negative copper wire.

The positive copper wire and the negative copper wire are respectively coupled to the positive output terminal of the output driver and the negative output terminals of the output driver. The positive copper wire includes a first end and a second end. The first end of the positive copper wire is coupled to positive output terminal of the output driver, and the second end of the positive copper wire extends along the at least one audio wire cluster. The negative copper wire includes a first end and a second end. The first end of the negative copper wire is coupled to negative output terminal of the output driver, and the second end of the negative copper wire extends along the at least one audio wire cluster. One positive copper wire and one adjacent negative copper wire form a loop with one group of surface mount light emitting diodes serially conductively attached between the adjacent positive copper wire and negative copper wire. The positive copper wire is divided into a number of sub-positive copper wires. Each surface mount light emitting diode can be arranged between and coupled to corresponding two adjacent sub-positive copper wires.

The light emitting diodes light-emitting light string produces a light in constant effect or a light in flash effect. Three parallel light emitting diode light-emitting light strings form a light emitting diode marquee light wire, which can be controlled by the output driver to produce a flow of light in sequence, a constant effect, or a light in flash effect.

The light emitting diode marquee light wire is made of three or more light emitting diode light-emitting light strings. Each light emitting diode marquee light wire is made of a group of surface mount light emitting diodes, a positive copper wire, and a negative copper wire, or is made of a group of surface mount light emitting diodes and a flexible printed circuit board. The acousto-optic controller outputs current meeting the rated voltage of the light emitting diode marquee light wire or the light emitting diode light-emitting light string, thus the light emitting diode marquee light wire or the light emitting diode light-emitting light string lights. The light emitting diode marquee light wire can light in time to music. The luminance and rhythm that the light emitting diode marquee light wire lights can be controlled via the microprocessor turning on the three or more light emitting diode light-emitting light strings in sequence or altering the voltage and frequency of the alternating current electric.

In accordance with a preferred embodiment of the invention, the positive copper wires and the negative copper wires are polyurethane-coated copper wires.

In accordance with a preferred embodiment of the invention, each electroluminescent cable includes at least three electroluminescent wires and a non-electroluminescent wire which is common (common bare wire). Each electroluminescent wire includes a first end and a second end. The common bare wire includes a first end and a second end. The first ends of the electroluminescent wires and the first end of the common bare wire are coupled to output terminals of the output driver. The second ends of the electroluminescent wires contact the second end of the common bare wire and are wound spirally on an outer surface of the audio wire cluster.

In accordance with a preferred embodiment of the invention, the acousto-optic audio signal cable further includes a number of insulating layers, and a number of metal woven mesh shield layers or aluminum foil shield layers arranged between the light emitting diode marquee light wire and the audio wire cluster, arranged between the light emitting diode light-emitting light string and the audio wire cluster, or arranged between the electroluminescent cable and the audio wire cluster.

In accordance with a preferred embodiment of the invention, the acousto-optic controller further includes a housing and a power connector. The power connector is embedded in the housing. The circuit board is fixed in the housing. The circuit board further includes a power supply circuit component. The power supply circuit component is coupled to the power connector to receive power. The power supply circuit component is further coupled to the sampling amplifier circuit component, the A/D conversion circuit component, the microprocessor, and the output driver to provide power to the sampling amplifier circuit component, the A/D conversion circuit component, the microprocessor, and the output driver. Or the power supply circuit component is further coupled to the bluetooth transmit-receive circuit, the D/A conversion circuit component, the microprocessor, and the output driver.

In accordance with a preferred embodiment of the invention, at least one light emitting diode marquee light wire, at least one light emitting diode light-emitting light string, or at least one electroluminescent cable is arranged in parallel on at least one side of the audio wire cluster of the guitar cable, the microphone cable, the speaker cable, or the earphone cable, or is wound in a spiral on the outer surface of the audio wire cluster of the guitar cable, the microphone cable, the speaker cable, or the earphone cable, to form an integrated wire. The integrated wire is wrapped in a transparent or light-transmitting insulating layer and is coupled to the acousto-optic controller.

In accordance with a preferred embodiment of the invention, the light emitting diode marquee light wire or each light emitting diode light-emitting light string includes a group of surface mount light emitting diodes and a flexible printed circuit board. The light emitting diode marquee light wire or each light emitting diode light-emitting light string is coupled to output terminals of the output driver. Another object of the present disclosure is to provide an acousto-optic audio signal cable includes a group of surface mount light emitting diodes, a signal conductor, a signal ground, a light emitting diode light-emitting light string positive wire, a light emitting diode light-emitting light string negative wire, and a flexible printed circuit board. The signal conductor, the signal ground, the light emitting diode light-emitting light string positive wire, and the light emitting diode light-emitting light string negative wire are printed on the flexible printed circuit board. Two groups of plug-in conductive strips are respectively arranged at two ends of the flexible printed circuit board. The plug-in conductive strips are parallel with each other. The plug-in conductive strips are respectively coupled to the signal conductor, the signal ground, the light emitting diode light-emitting light string positive wire, and the light emitting diode light-emitting light string negative wire. The plug-in conductive strips are directly plugged in the acousto-optic controller and an earphone. The connection between the circuit board and the first external device is established. The audio signal is transmitted from the acousto-optic controller to the earphone. The acousto-optic controller further controls the light emitting diode light-emitting light string to light in a flash in time to music.

In accordance with a preferred embodiment of the invention, each end of the acousto-optic audio signal cable includes a terminal. The terminal of the electric guitar cable, or the microphone cable, or the speaker cable has a diameter of about 6.35 millimeters or 6.5 millimeters. The terminal of the mobile phone earphone or the loudspeaker has a diameter of 3.5 millimeters. One terminal is coupled to the sound device, such as a guitar, a microphone, a mobile phone, a speaker, a audio player, or the like, and the other terminal is coupled to a sound amplifying device, such as a loudspeaker, an earphone, or the like. The audio wires of the acousto-optic audio signal cable are parallel with each other and are coupled to the sampling amplifier circuit component. The electroluminescent wires of the acousto-optic audio signal cable, the light emitting diode marquee light wire of the acousto-optic audio signal cable, or the light emitting diode light-emitting light string of the acousto-optic audio signal cable are coupled to the output driver.

In accordance with a preferred embodiment of the invention, the terminal of the acousto-optic audio signal cable coupled to the mobile phone is a lightning connector or a type-C connector. The acousto-optic audio signal cable is further coupled to a battery of the mobile phone. The power supply circuit component is coupled to the battery of the mobile phone and obtains power from the battery of the mobile phone. Thereby, the storage battery, the battery circuit, and the power connector can be omitted.

In accordance with a preferred embodiment of the invention, a cross-section of the guitar cable, the microphone cable, the speaker cable, or the earphone cable can be circular, flat, or elliptical.

In accordance with a preferred embodiment of the invention, the sampling amplifier circuit component is coupled to the audio wires to sample analog sound signal from the audio wires. The output driver of the acousto-optic controller is coupled to the at least one light emitting diode marquee light wire, the light emitting diode light-emitting light string, or the electroluminescent cable.

In accordance with a preferred embodiment of the invention, the electroluminescent wires of the acousto-optic audio signal cable or the light emitting diode marquee light wire of the acousto-optic audio signal cable includes a first end and a second end, the first ends of the electroluminescent wires or the first end of the light emitting diode marquee light wire are coupled to the output driver, and the second ends of the electroluminescent wires or the second end of the light emitting diode marquee light wire are not connected.

In accordance with a preferred embodiment of the invention, the acousto-optic controller includes a housing. The housing defines a through hole to receive the power connector. The acousto-optic controller further includes an on/off switch, a power line, and a plug. The switch is arranged on the housing. When the switch is on, the power supply circuit component provides power from the external power source to the sampling amplifier circuit component, the A/D conversion circuit component, the microprocessor, and the output driver. When the switch is off, the power supply circuit component stops providing power to the sampling amplifier circuit component, the A/D conversion circuit component, the microprocessor, and the output driver. The power line is detachably coupled to the power connector, and the plug is coupled to the power line. The power connector is coupled to the external power source via the power line and the plug.

The acousto-optic controller is arranged at an end of the acousto-optic audio signal cable or a position of the acousto-optic audio signal cable excluding the end of the acousto-optic audio signal cable. When the acousto-optic controller is arranged at an end of the acousto-optic audio signal cable, the acousto-optic audio signal further includes a first terminal. The first terminal is coupled to another end of the acousto-optic audio signal cable via another acousto-optic audio signal, or directly coupled to another end of the acousto-optic audio signal cable. When the acousto-optic controller is arranged at the position of the acousto-optic audio signal cable excluding the end of the acousto-optic audio signal cable, the acousto-optic audio signal cable further includes a first terminal and a second terminal. The first terminal and the second terminal are respectively arranged at two ends of the acousto-optic audio signal cable.

In accordance with a preferred embodiment of the invention, the power supply circuit component of the acousto-optic controller provides power for the sampling amplifier circuit component, the A/D conversion circuit component, the microprocessor, and the output driver, or provides power for the bluetooth transmit-receive circuit, the D/A conversion circuit component, the microprocessor, and the output driver. The power supply circuit component of the acousto-optic controller includes a storage battery and a battery circuit. The storage battery is a lithium-ion rechargeable battery. The battery circuit includes a charge circuit. The charge circuit is coupled to the lithium-ion rechargeable battery and is configured to recharge the lithium-ion rechargeable battery.

In accordance with a preferred embodiment of the invention, another way to provide power for the acousto-optic controller is to provide a power adapter. The power adapter is arranged in the housing. The acousto-optic controller further includes a power line and a plug. The power line extends through the housing and is coupled to the power adapter. The plug is coupled to the power line. The power adapter is coupled to the external power source via the power line and the plug, and provides the power from the external power source to the sampling amplifier circuit component, the A/D conversion circuit component, the microprocessor, and the output driver.

In accordance with a preferred embodiment of the invention, the sampling amplifier circuit component samples the analog audio signal from the audio wire cluster and outputs the analog audio signal to the A/D conversion circuit component. The A/D conversion circuit component converts the analog audio signal to the digital audio signal, and outputs the digital audio signal to the microprocessor. The microprocessor can convert the volume and the rhythm of the audio signal to a corresponding voltage and frequency of electric current, and controls the voltage output of the output driver. Thus, the microprocessor controls the luminance and light rhythm of the electroluminescent cable, the light emitting diode marquee light wire, or the light emitting diode light-emitting light string.

In accordance with a preferred embodiment of the invention, the bluetooth transmit-receive circuit wirelessly receives digital audio signal from the mobile phone, and outputs the digital audio signal from the mobile phone to the microprocessor. The microprocessor accordingly controls the output driver to drive the light emitting diode light-emitting light string to light. The luminance and rhythm that the light emitting diode light-emitting light string lights can be controlled according to the sound and rhythm of the audio signal. The D/A conversion circuit component converts the digital audio signal from the mobile phone to analog audio signal, and output the analog audio signal to the earphone to play. An A/D conversion circuit component is coupled between a microphone and the bluetooth transmit-receive circuit. The A/D conversion circuit component converts the analog audio signal to the digital audio signal, and output the digital audio signal to the bluetooth transmit-receive circuit. The bluetooth transmit-receive circuit accordingly transmit the digital audio signal to the mobile phone via Bluetooth®.

BRIEF DESCRIPTION OF THE DRAWINGS

Implementations of the present technology will now be described, by way of example only, with reference to the attached figures.

DETAILED DESCRIPTION

Figure 1:
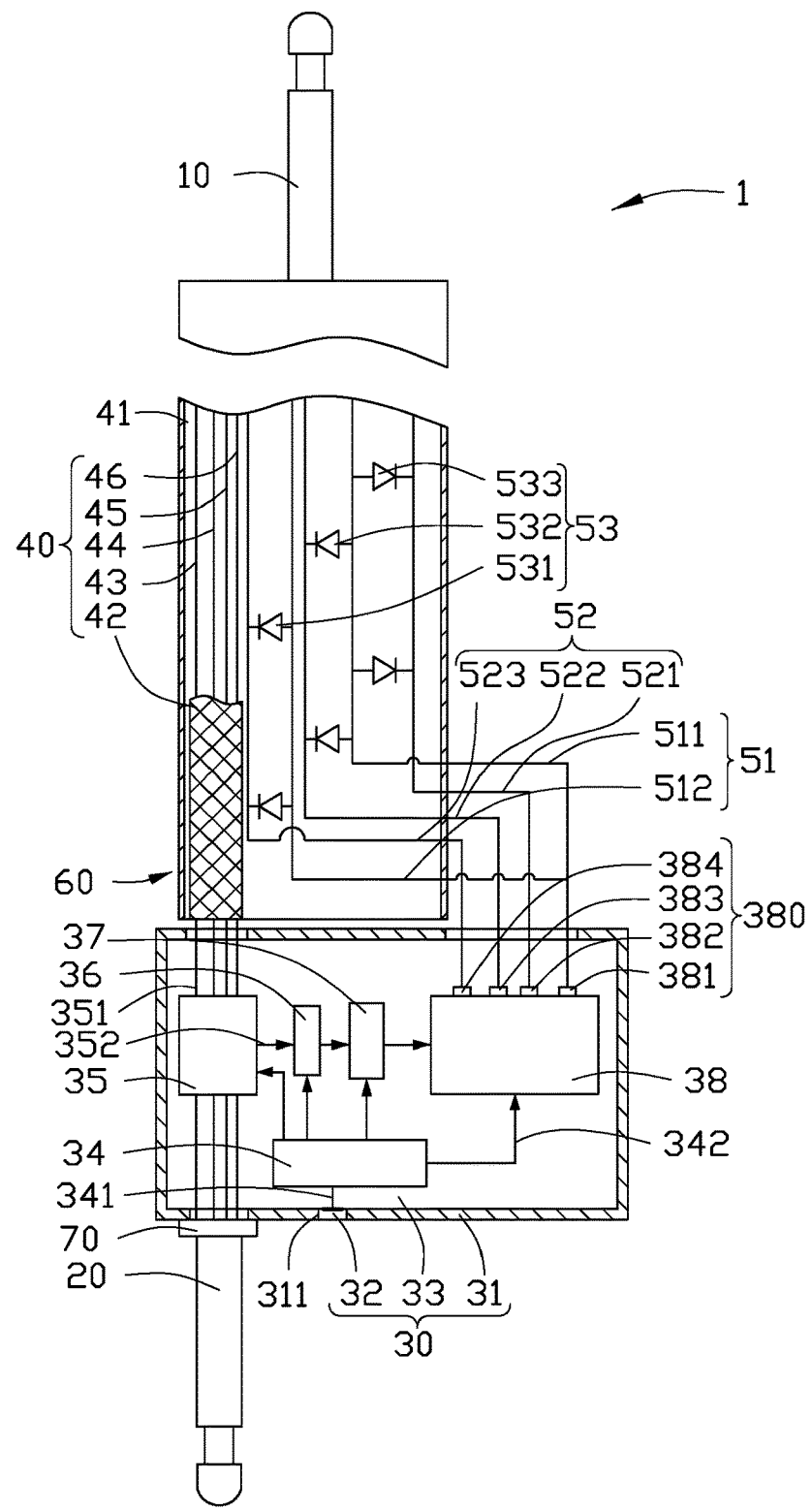
FIG. 1 is an isometric view of a first embodiment of an acousto-optic audio signal cable.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

Figure 2:
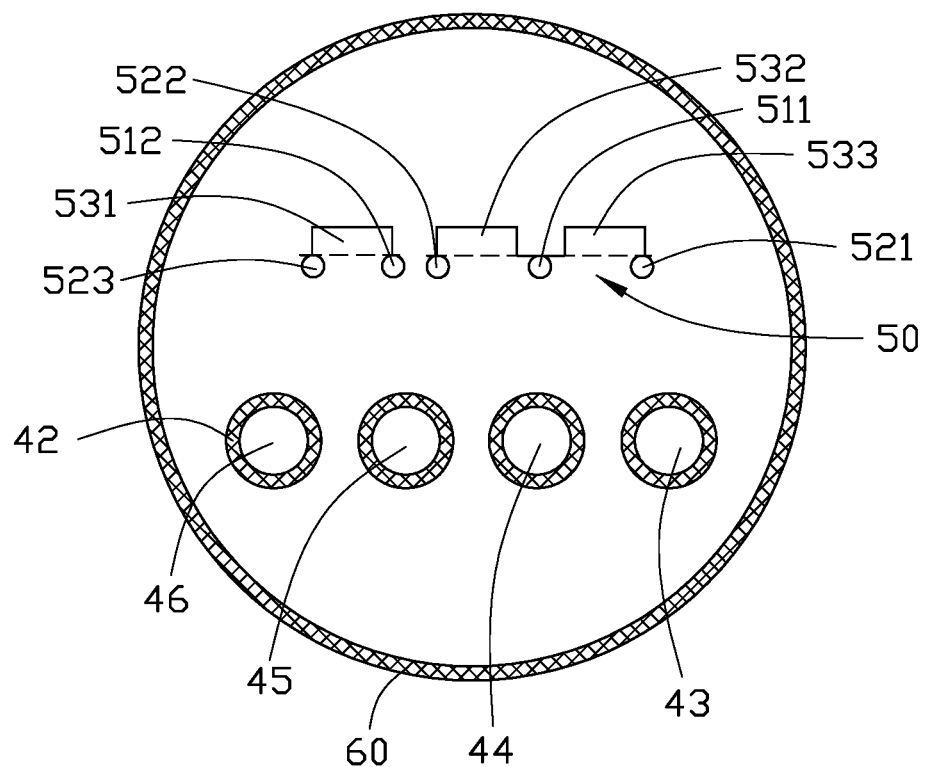
FIG. 2 is a cross-sectional view of the acousto-optic audio signal cable of FIG. 1.

FIGS. 1-2 illustrate a first embodiment of an acousto-optic audio signal cable 1. In at least one embodiment, the acousto-optic audio signal cable 1 can include a first terminal 10, a second terminal 20, an acousto-optic controller 30, a first audio wire cluster 40, a first light emitting diode marquee light wire 50, and a first transparent or light-transmitting insulating layer 60. The first terminal 10 can be configured to couple to a sound device, such as a microphone, a television, or a mobile phone. The second terminal 20 can be configured to couple to a sound amplifying device, such as a loudspeaker, or an earphone. The acousto-optic controller 30 can be coupled among the first audio wire cluster 40, the first light emitting diode marquee light wire 50, and the second terminal 20. In at least one embodiment, the acousto-optic controller 30 can be directly coupled to the second terminal 20. The first audio wire cluster 40 can be coupled between the first terminal 10 and the acousto-optic controller 30. The first light emitting diode marquee light wire 50 can give illumination. The first light emitting diode marquee light wire 50 and the first audio wire cluster 40 can be integrated into an integrated wire cluster. The first transparent or light-transmitting insulating layer 60 can wrap the integrated wire cluster. In at least one embodiment, the audio signal can be transmitted from the sound device to the sound amplifying device via the first terminal 10, the audio wire cluster 40, the acousto-optic controller 30, and the second terminal 20 in sequence. Thus, the sound amplifying device can output sound from the sound device. Moreover, the acousto-optic controller 30 can receive analog audio signal from the first audio wire cluster 40 and control the first light emitting diode marquee light wire 50 to light according to the analog audio signal from the first audio wire cluster 40. In other embodiments, the acousto-optic audio signal cable 1 can be coupled to the sound device and the sound amplifying device without the first terminal 10 and the second terminal 20, or without the first terminal 10, or without the second terminal 20.

In at least one embodiment, the acousto-optic controller 30 can include a housing 31, a power connector 32, and a circuit board 33. The power connector 32 can be embedded in the housing 31. In at least one embodiment, the housing 31 can define a through hole 311. The power connector 32 can be received in the through hole 311. In at least one embodiment, the power connector 32 can be coupled between the circuit board 33 and an external power source. Thus, the circuit board 33 can obtain power from the external power source via the power connector 32. In at least one embodiment, the acousto-optic controller 30 can further include a power line and a plug. The power line can be detachably coupled to the power connector 32, and the plug is coupled to the power line. Thus, the power connector 32 can be coupled to the external power source via the power line and the plug.

In at least one embodiment, the circuit board 33 can be fixed in the housing 31. In at least one embodiment, the circuit board 33 can include a power supply circuit component 34, a sampling amplifier circuit component 35, an A/D conversion circuit component 36, a microprocessor 37, and a direct current (DC) output driver 38. The power supply circuit component 34 can include an input terminal 341 and at least one output terminal 342. The input terminal 341 of the power supply circuit component 34 can be coupled to the power connector 32 to obtain power from the external power source via the power connector 32. The at least one output terminal 342 of the power supply circuit component 34 can be further coupled to the sampling amplifier circuit component 35, the A/D conversion circuit component 36, the microprocessor 37, and the DC output driver 38 to provide power for the sampling amplifier circuit component 35, the A/D conversion circuit component 36, the microprocessor 37, and the DC output driver 38.

In at least one embodiment, the power supply circuit component 34 can be a rechargeable battery, and the external power source can charge the power supply circuit component 34. In detail, the power supply circuit component 34 of the acousto-optic controller 30 can include a storage battery and a battery circuit. The storage battery can be a lithium-ion rechargeable battery. The battery circuit can include a charge circuit. The charge circuit can be coupled to the lithium-ion rechargeable battery and can be configured to recharge the lithium-ion rechargeable battery. In other embodiments, the acousto-optic controller 30 can include a power adapter. The power adapter can be arranged in the housing. The acousto-optic controller 30 can further include another power line and another plug. The power line can extend through the housing and can be coupled to the power adapter. The plug can be coupled to the power line. The power adapter can be coupled to the external power source via the power line and the plug, and can provide the power from the external power source to the sampling amplifier circuit component 35, the A/D conversion circuit component 36, the microprocessor 37, and the output driver 38.

In at least one embodiment, the sampling amplifier circuit component 35 can be coupled between the first audio wire cluster 40 and the A/D conversion circuit component 36. In at least one embodiment, the sampling amplifier circuit component 35 can include an input terminal 351 and an output terminal 352. The input terminal 351 of the sampling amplifier circuit component 35 can be coupled to first audio wire cluster 40. The output terminal 352 of the sampling amplifier circuit component 35 can be coupled to the A/D conversion circuit component 36. The sampling amplifier circuit component 35 can be configured to sample analog audio signal from the first audio wire cluster 40. The A/D conversion circuit component 36 can be coupled between the sampling amplifier circuit component 35 and the microprocessor 37. The A/D conversion circuit component 36 can convert the analog audio signal to a digital audio signal. The DC output driver 38 can be coupled between the microprocessor 37 and the first light emitting diode marquee light wire 50. The DC output driver 38 can include a first group of output terminals 380, a DC positive output terminal 381, and three DC negative output terminals 382, 383, 384. The DC output driver 38 can drive the first light emitting diode marquee light wire 50 to light.

In at least one embodiment, the microprocessor 37 can be coupled between the A/D conversion circuit component 36 and the DC output driver 38. The microprocessor 37 can output a pulse width signal to the DC output driver 38 to drive the first light emitting diode marquee light wire 50 according to the digital audio signal, to produce regular flashes of light or a brightening and dimming of light in sequence. In at least one embodiment, the microprocessor 37 can pre-store a relationship between the digital audio signal and the pulse width signal. Thus, the microprocessor 37 can determine a pulse width signal according to the digital audio signal and the pre-stored relationship between the digital audio signal and the pulse width signal, and output the determined pulse width signal to the DC output driver 38 to drive the first light emitting diode marquee light wire 50 according to the digital audio signal.

In at least one embodiment, the first audio wire cluster 40 can include a number of first audio wires 41 and a number of shield layers 42. In at least one embodiment, the first audio wires 41 can be parallel with each other or be wound in a spiral, and preferably can be respectively three signal conductors 43, 44, 45 and a ground conductor 46. In at least one embodiment, each first audio wire 41 can include metal or other shielding for the wires. Each wire can be made of low impedance and shielded high conductivity material. Each first audio wire 41 can include a first end and a second end. The first ends of the first audio wires 41 can be coupled to the first terminal 10. The second ends of the first audio wires 41 can be coupled to the sampling amplifier circuit component 35. The first audio wires 41 can transmit the audio signal from the sound device to the sampling amplifier circuit component 35. In at least one embodiment, each first audio wire 41 can be wrapped in one shield layer 42. In at least one embodiment, each shield layer 42 can be a metal woven mesh shield layer or an aluminum foil shield layer. The shield layers 42 can increase an anti-interference ability of the first audio wires 41.

In at least one embodiment, the first light emitting diode marquee light wire 50 can include a group of positive copper wires 51, a group of negative copper wires 52, and a number of groups of surface mount light emitting diodes 53.

The group of positive copper wires 51 and the group of negative copper wires 52 can be arranged at one side of the first audio wire cluster 40. In at least one embodiment, the group of positive copper wires 51 can be the group of positive polyurethane-coated enameled copper wires. In at least one embodiment, the group of positive copper wires 51 can include positive copper wires 511, 512. Each positive copper wire can include a first end and a second end. The first ends of the positive copper wires 511, 512 can be coupled to the DC positive output terminals 381 of the DC output driver 38, and the second ends of the positive copper wires 511, 512 can extend along the audio wire cluster 40 and are not connected.

In at least one embodiment, the group of negative copper wires 52 can be the group of negative polyurethane-coated enameled copper wires. In at least one embodiment, the group of negative copper wires 52 can include three negative copper wires 521, 522, 523. Each negative copper wire can include a first end and a second end. The first ends of the negative copper wires 521, 522, 523 can be respectively coupled to the DC negative output terminals 382, 383, 384 of the DC output driver 38, and the second ends of the negative copper wires 521, 522, 523 can extend along the audio wire cluster 40 and be not connected. Thus, the positive copper wires 511, 512 and the negative copper wires 521, 522, 523 can be parallel with each other.

In at least one embodiment, the groups of surface mount light emitting diodes 53 can be respectively a first group of surface mount light emitting diodes 531, a second group of surface mount light emitting diodes 532, and a third group of surface mount light emitting diodes 533. In at least one embodiment, the first group of surface mount light emitting diodes 531 can include at least three surface mount light emitting diodes, the second group of surface mount light emitting diodes 532 can include at least three surface mount light emitting diodes, and the third group of surface mount light emitting diodes 533 can include at least three surface mount light emitting diodes.

The first group of surface mount light emitting diodes 531, the second group of surface mount light emitting diodes 532, and the third group of surface mount light emitting diodes 533 can be respectively conductively attached between and coupled to the adjacent positive copper wires and negative copper wires. In detail, the first group of surface mount light emitting diodes 531 can be conductively attached between and coupled to the adjacent positive copper wire 512 and negative copper wire 523, the second group of surface mount light emitting diodes 532 can be conductively attached between and coupled to the adjacent positive copper wire 511 and negative copper wire 522, and the third group of surface mount light emitting diodes 533 can be conductively attached between and coupled to the adjacent positive copper wire 511 and negative copper wire 521. The groups of surface mount light emitting diodes can be conductively attached between adjacent positive copper wire and negative copper wire at preset distance and preset direction. In at least one embodiment, the preset distance and the preset direction that the first group of surface mount light emitting diodes 531, the second group of surface mount light emitting diodes 532, and the third group of surface mount light emitting diodes 533 conductively attached can be same or difference.

In at least one embodiment, one positive copper wire and one adjacent negative copper wire form a loop with one group of surface mount light emitting diodes conductively attached between adjacent positive copper wire and negative copper wire, and one positive copper wire and two negative copper wires arranged at opposite sides of the one positive copper wire form loops with two groups of surface mount light emitting diodes respectively conductively attached between corresponding adjacent positive copper wire and negative copper wire.

For example, the positive copper wire 512 and the negative copper wire 523 form a loop with the first group of surface mount light emitting diodes 531, and the positive copper wire 511 and the negative copper wires 521, 522 form loops with the second group of surface mount light emitting diodes 532 and the third group of surface mount light emitting diodes 533.

In at least one embodiment, the first transparent or light-transmitting insulating layer 60 can wrap the first audio wire cluster 40 and the first light emitting diode marquee light wire 50. Thus, the light emitted by the first light emitting diode marquee light wire 50 can be presented to the user via the first transparent or light-transmitting insulating layer 60.

To use the acousto-optic audio signal cable 1, the first terminal 10 can be coupled to the sound device, and the second terminal 20 can be coupled to the sound amplifying device. When the sound device speaks, the audio spoke by the sound device can be transmitted to the sound amplifying device via the acousto-optic audio signal cable 1, and then the sound amplifying device can output the audio. And when the sound device speaks, the sampling amplifier circuit component 35 samples the analog audio signal from the acousto-optic audio signal cable 1, and outputs the sampled analog audio signal to the A/D conversion circuit component 36. The A/D conversion circuit component 36 can convert the analog audio signal to the digital audio signal, and output the converted digital audio signal to the microprocessor 37. The microprocessor 37 can output pulse width signal to the DC output driver 38 to conduct some loops according to the digital audio signal from the A/D conversion circuit component 36, thereby the group of surface mount light emitting diodes of corresponding loops can light.

Thus, the microprocessor 37 can control the DC output driver 38 to drive the first light emitting diode marquee light wire 50 according to the digital audio signal, to produce regular flash of light or produce a flow of light in sequence. Thus, the acousto-optic audio signal cable 1 can produce a flash effect or a chasing in sequence as running water effect corresponding to each sound in the audio spoke by the sound device, thereby the light effect produced by the acousto-optic audio signal cable 1 corresponding to each sound in the audio can be characterized.

In the embodiment, the acousto-optic controller 30 can further include a switch. The switch is arranged on the housing, and is operable to switch between on and off. When the switch is on, the power supply circuit component 36 provides power from the external power source to the sampling amplifier circuit component 35, the A/D conversion circuit component 36, the microprocessor 37, and the output driver 38. When the switch is off, the power supply circuit component 36 stops providing power to the sampling amplifier circuit component 35, the A/D conversion circuit component 36, the microprocessor 37, and the output driver 38.

In other embodiments, the group of positive copper wires 51 can include three positive copper wires. Each positive copper wire corresponds to one negative copper wire. Namely, one positive copper wire and one adjacent negative copper wire form a loop with one group of surface mount light emitting diodes conductively attached between adjacent positive copper wire and negative copper wire.

Figure 3:
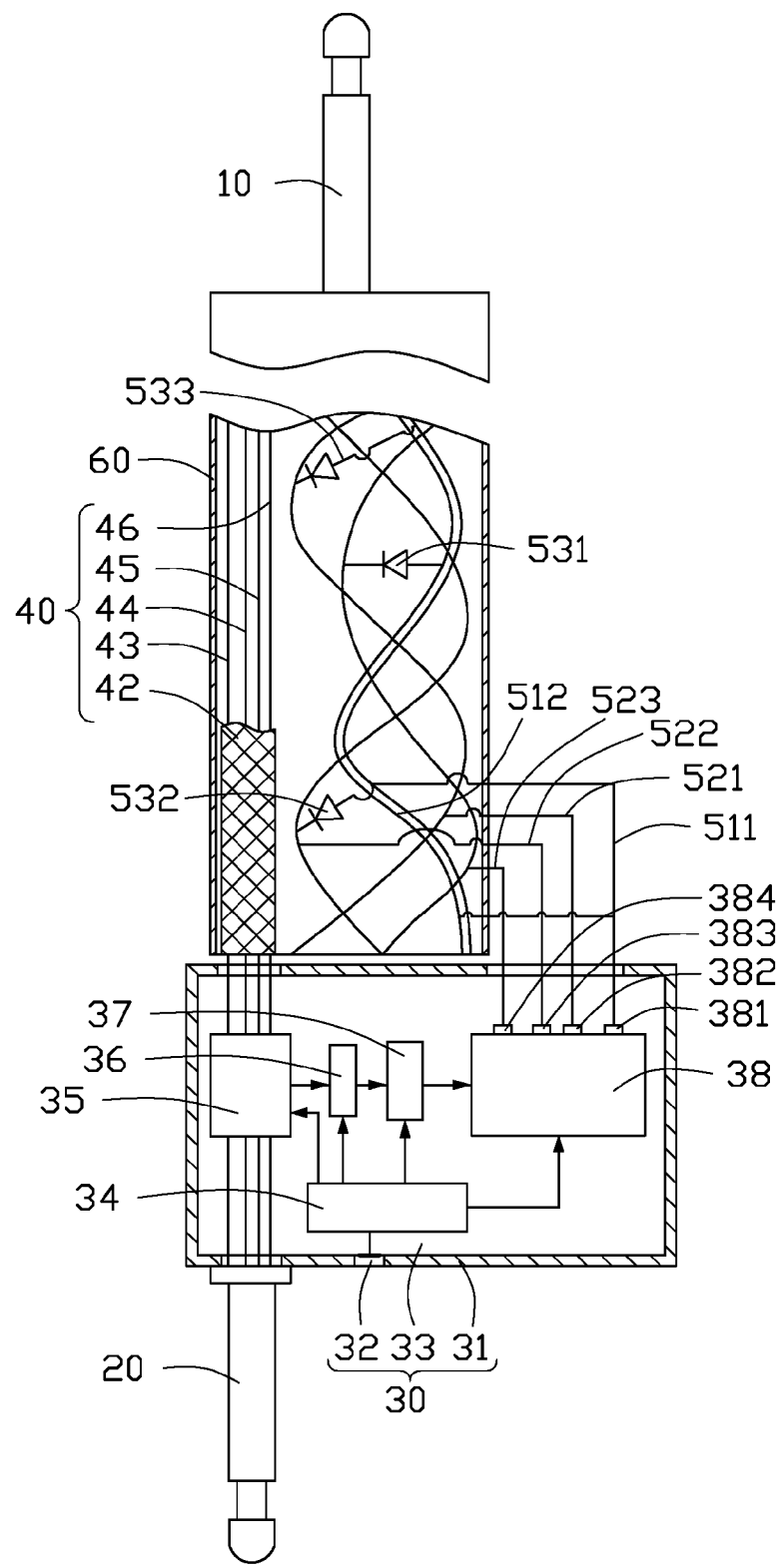
FIG. 3 is an isometric view of a second embodiment of an acousto-optic audio signal cable.
Figure 4:
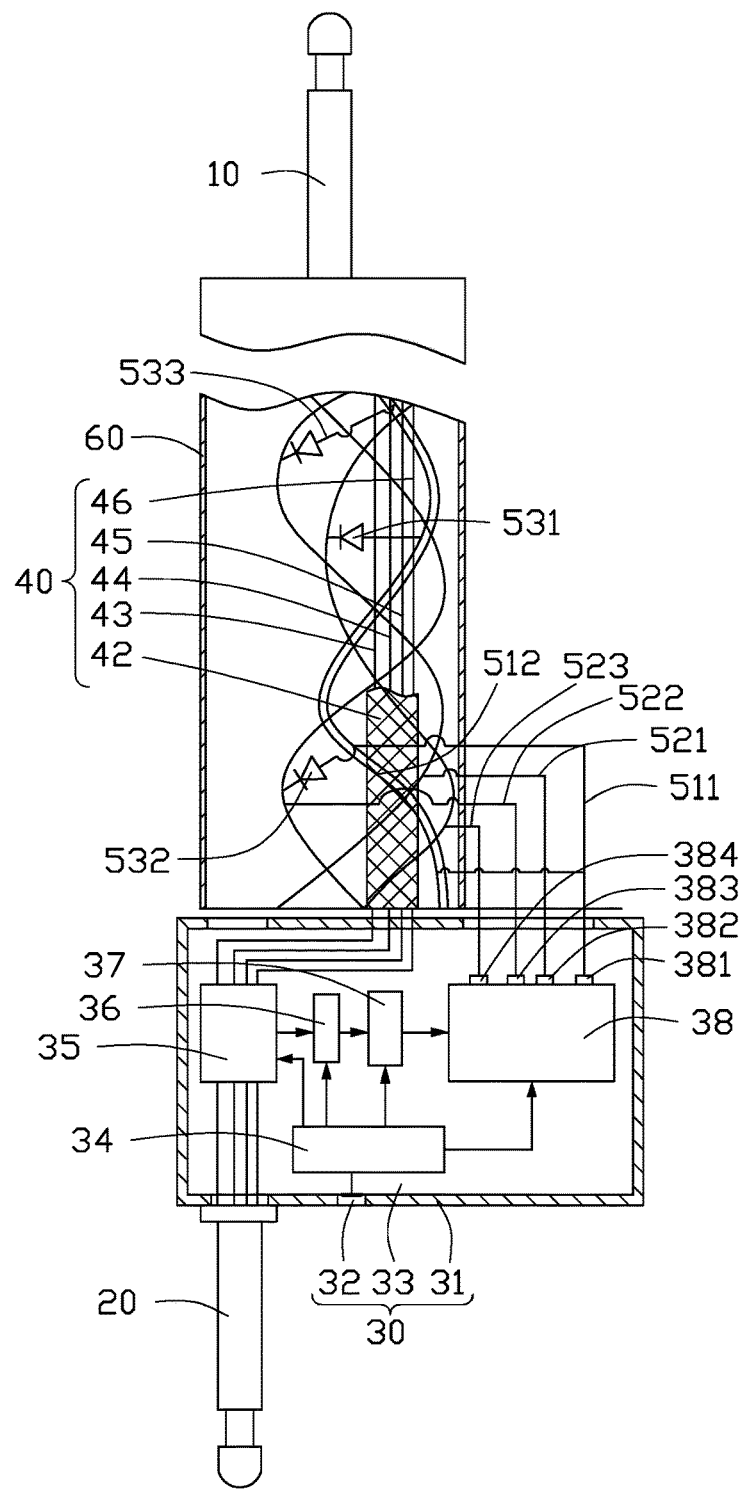
FIG. 4 is similar to FIG. 3, but showing the light emitting diode light cable would in a spiral with the first audio wire cluster.

FIG. 3 illustrates a second embodiment of an acousto-optic audio signal cable 1. The acousto-optic audio signal cable 1 of the second embodiment can be similar to the acousto-optic audio signal cable 1 of the first embodiment, except that:

In the second embodiment, the two positive copper wires 511, 512 and the three negative copper wires 521, 522, 523 can form three pairs of light emitting diode emitting wires, the three pairs of light emitting diode emitting wires can be would in a spiral at a preset distance and be spaced from the first audio wire cluster 40 to form a light emitting diode light cable, but not be parallel with each other as shown in the first embodiment. The light emitting diode light cable can be parallelly arranged at one side of the first audio wire cluster 40. Because the two positive copper wires 511, 512 and the three negative copper wires 521, 522, 523 are would in a spiral, the cross-sectional area of the acousto-optic audio signal cable 1 can be small, thus the acousto-optic audio signal cable 1 can afford a large enough pull force and can be flexible. In an alternative embodiment, as shown in FIG. 4, the three pairs of light emitting diode emitting wires can be would in a spiral at an outer surface of the audio wire cluster 40. The would three pairs of light emitting diode emitting wires can form the light emitting diode light cable.

Figure 5:
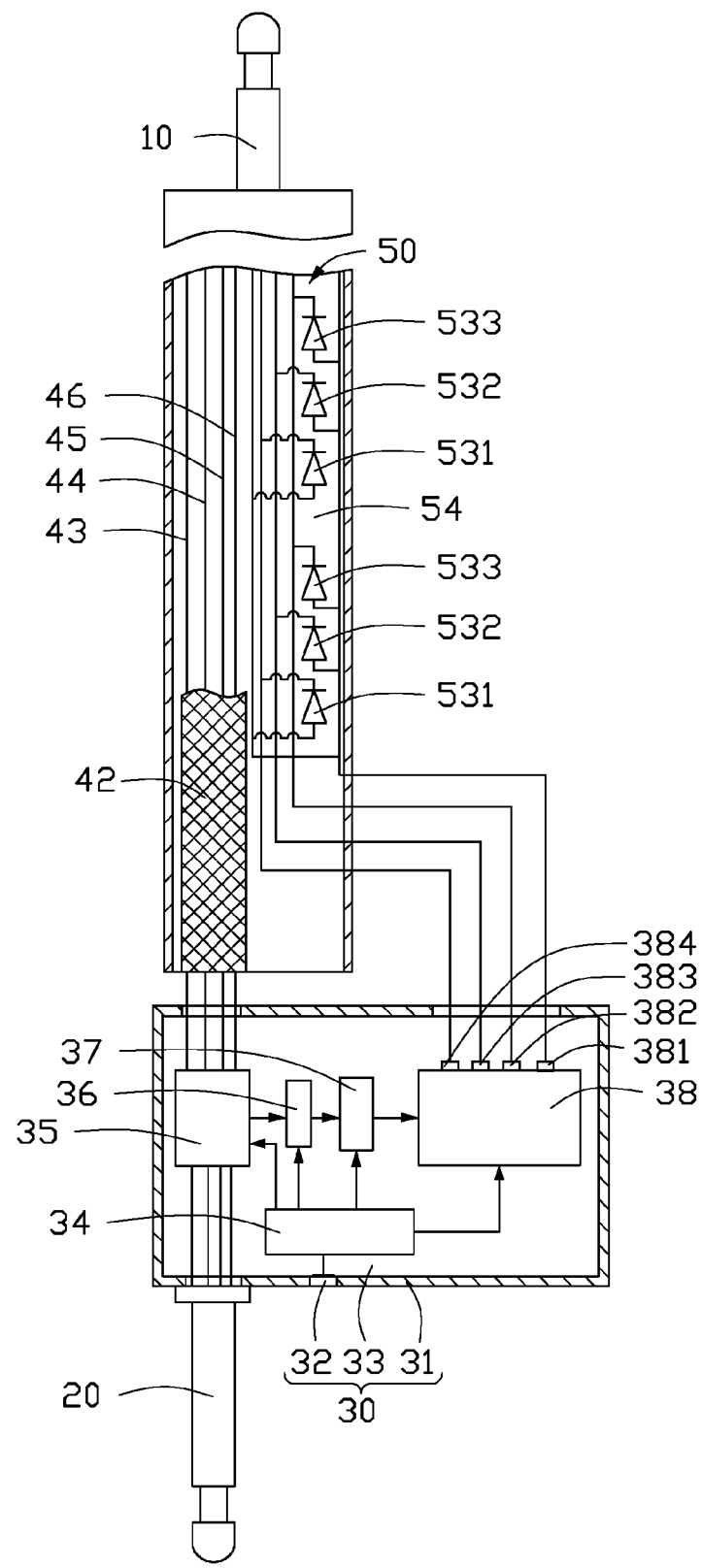
FIG. 5 is an isometric view of a third embodiment of an acousto-optic audio signal cable.

FIG. 5 illustrates a third embodiment of an acousto-optic audio signal cable 1. The acousto-optic audio signal cable 1 of the third embodiment can be similar to the acousto-optic audio signal cable 1 of the first embodiment, except that:

In the third embodiment, the first light emitting diode marquee light wire 50 can further include a flexible printed circuit board (PCB) 54. The surface mount light emitting diodes can be serially or parallelly mounted at the flexible PCB 54, to form a dot-like light emitting diode marquee light wire. Thus, the cross-sectional area of the acousto-optic audio signal cable 1 can be small and the price of the acousto-optic audio signal cable 1 can be low. However, the acousto-optic audio signal cable 1 can produce light effect from 180° directions of the acousto-optic audio signal cable 1, and may produce a shadow.

Figure 6:
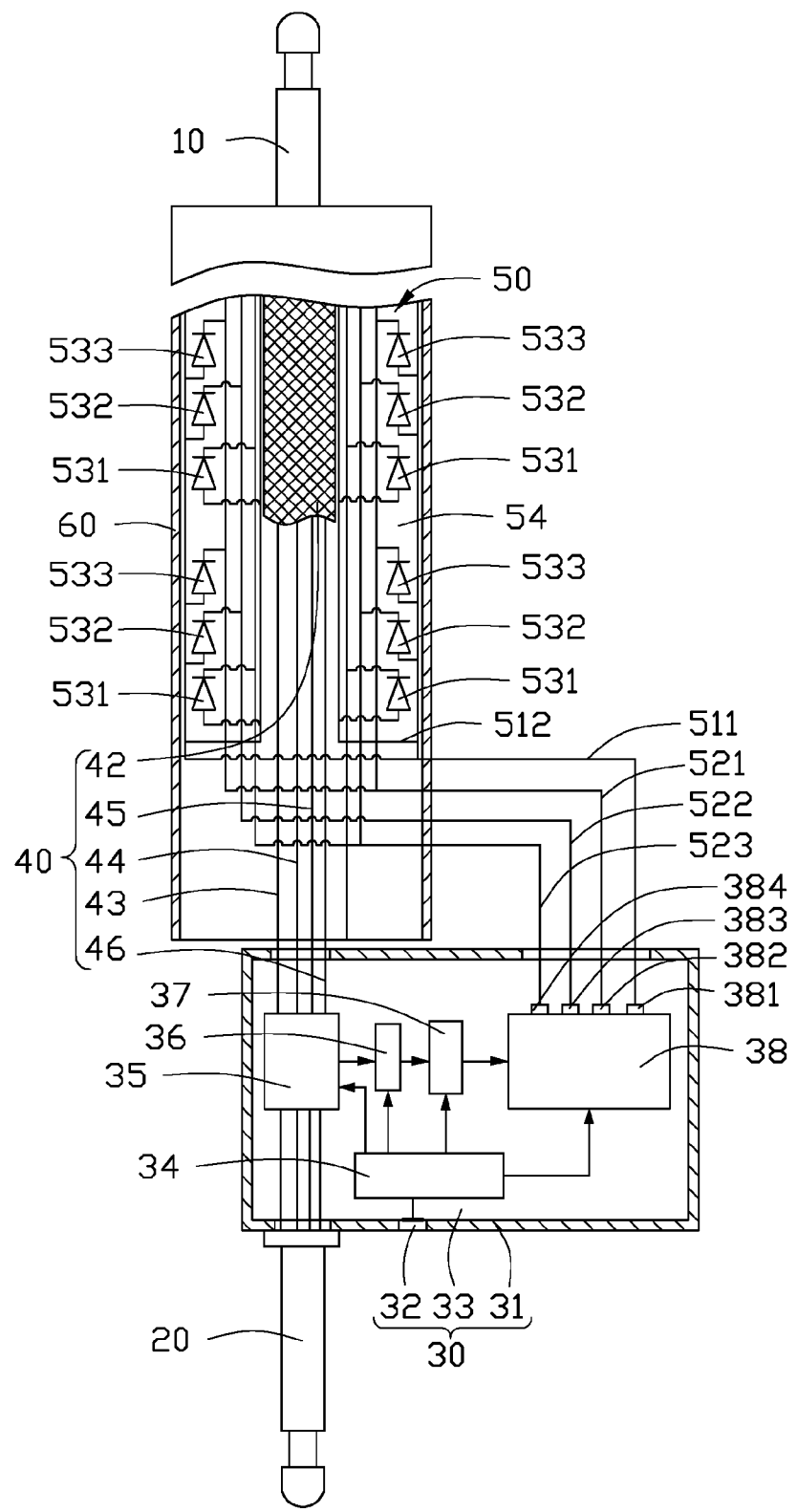
FIG. 6 is an isometric view of a fourth embodiment of an acousto-optic audio signal cable.

FIG. 6 illustrates a fourth embodiment of an acousto-optic audio signal cable 1. The acousto-optic audio signal cable 1 of the fourth embodiment can be similar to the acousto-optic audio signal cable 1 of the first embodiment, except that:

In the fourth embodiment, the number of the first light emitting diode marquee light wires 50 can be two, but not one as illustrated in the second embodiment. Each first light emitting diode marquee light wire 50 can further include a flexible printed circuit board (PCB) 54. The surface mount light emitting diodes can be serially or parallelly mounted at the flexible PCB 54, to form a dot-like light emitting diode marquee light wire. The first light emitting diode marquee light wires 50 can be coupled to the DC output driver 38. In the fourth embodiment, the positive copper wires 511, 512 can be replaced by an ordinary printed positive circuit, and the negative copper wires 521, 522, 523 can be replaced by an ordinary printed negative circuit. Thus, the acousto-optic audio signal cable 1 can produce light effect from all directions of the acousto-optic audio signal cable 1. And because the first light emitting diode marquee light wires 50 and the first audio wire cluster 40 can be wrapped in the first transparent or light-transmitting insulating layer 60, thus the light effect can be presented to the user via the first transparent or light-transmitting insulating layer 60.

In other embodiments, the number of the light emitting diode marquee light wires 50 can be three or more than three. The light emitting diode marquee light wires 50 can be arranged around the first audio wire cluster 40.

Figure 7:
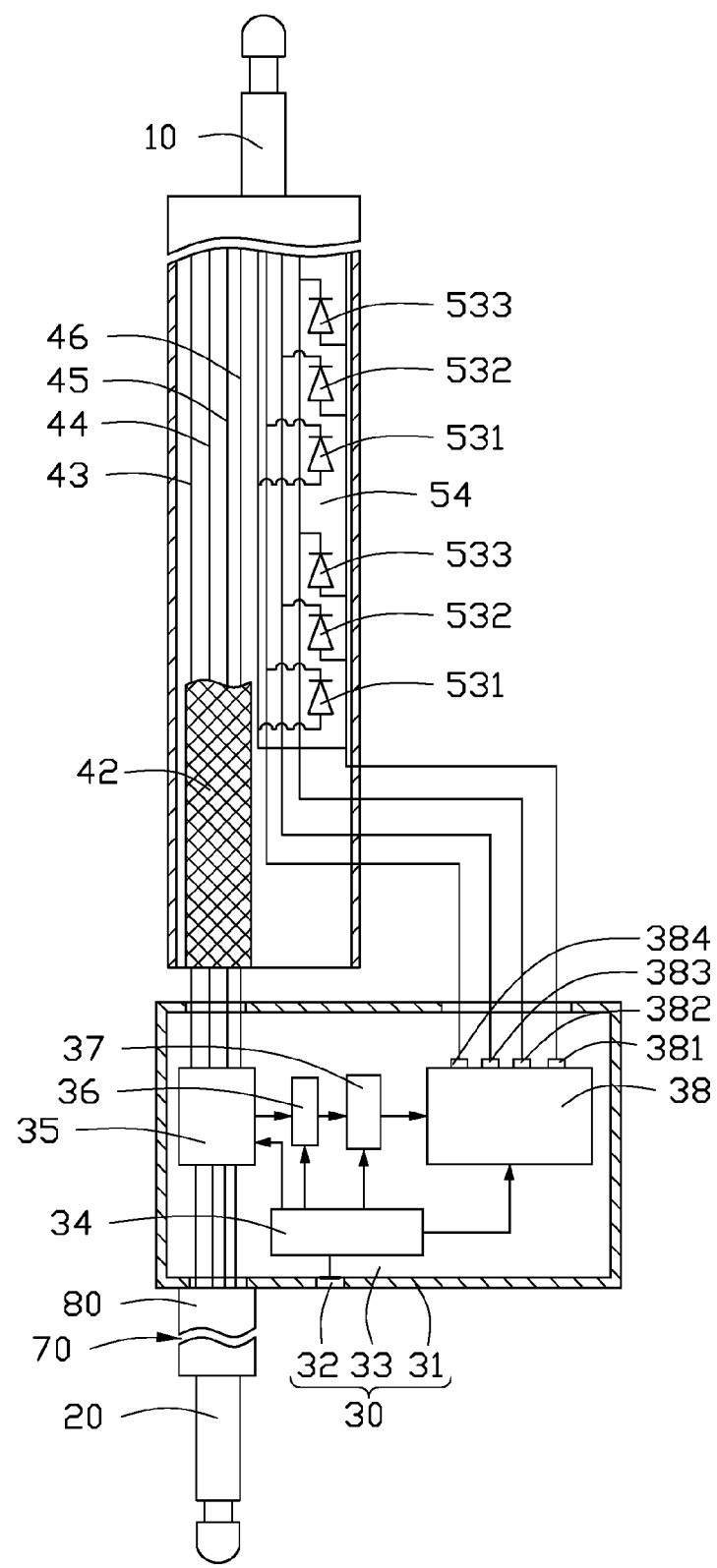
FIG. 7 is an isometric view of a fifth embodiment of an acousto-optic audio signal cable.
Figure 8:
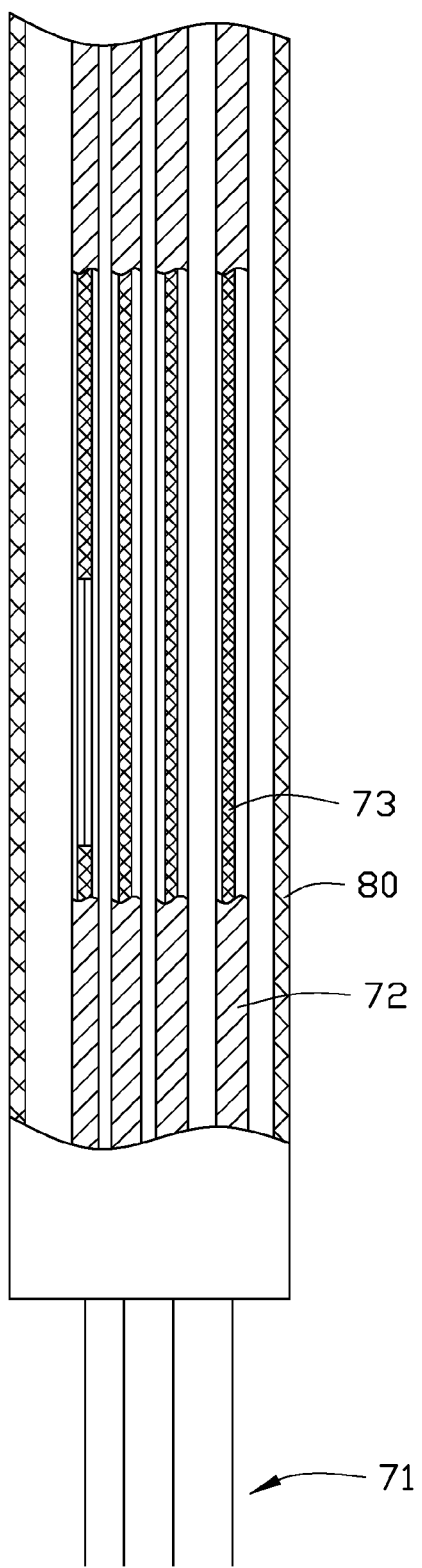
FIG. 8 is an isometric view of a second audio wire cluster of the acousto-optic audio signal cable of the fifth embodiment.

FIGS. 7-8 illustrate a fifth embodiment of an acousto-optic audio signal cable 1. The acousto-optic audio signal cable 1 of the fifth embodiment can be similar to the acousto-optic audio signal cable 1 of the fourth embodiment, except that:

In the fifth embodiment, the acousto-optic audio signal cable 1 can further include a second audio wire cluster 70 and a second transparent or light-transmitting insulating layer 80. The sampling amplifier circuit component 35 can be coupled to the second terminal 20 via the second audio wire cluster 70. In at least one embodiment, the structure of the second audio wire cluster 70 can be the same as the structure of the first audio wire cluster 40. The second audio wire cluster 70 can include a number of second audio wires 71. The second audio wire cluster 70 can be wrapped in the second transparent or light-transmitting insulating layer 80. The second audio wires 71 can be coupled between the sampling amplifier circuit component 35 and the second terminal 20. The second audio wires 71 can be configured to transmit the analog audio signal from the sampling amplifier circuit component 35 to the sound amplifying device via the second terminal 20. Each second audio wire 71 can be coupled to one corresponding first audio wire 41 in the sampling amplifier circuit component 35 or outside the sampling amplifier circuit component 35. Thus, the first audio wire cluster 40 and the second audio wire cluster 70 can transmit the analog audio signal from the sound device to the sound amplifying device via the first terminal 10 and the second terminal 20.

In at least one embodiment, the second audio wire cluster 70 can include a number of insulating layers 72. The second audio wire 71 can be wrapped in the insulating layer 72.

In detail, the second audio wire cluster 70 can further include a number of insulating layers 72 and a number of shield layers 73. Each second audio wire 71 can be wrapped in one shield layer 73, and each shield layer-wrapped second audio wire 71 can be wrapped in one insulating layer 72, and the insulating layers-wrapped second audio wire 71 can be wrapped in the second transparent or light-transmitting insulating layer 80.

In an alternative embodiment, the second audio wire cluster 70 can further include a number of insulating layers 72. Each second audio wire 71 can be wrapped in one insulating layer 72, and the insulating layers-wrapped second audio wire 71 can be wrapped in the second transparent or light-transmitting insulating layer 80.

Furthermore, the alternative in the fifth embodiment with respect to the fourth embodiment can also be applied on the first, second, and third embodiments.

Figure 9:
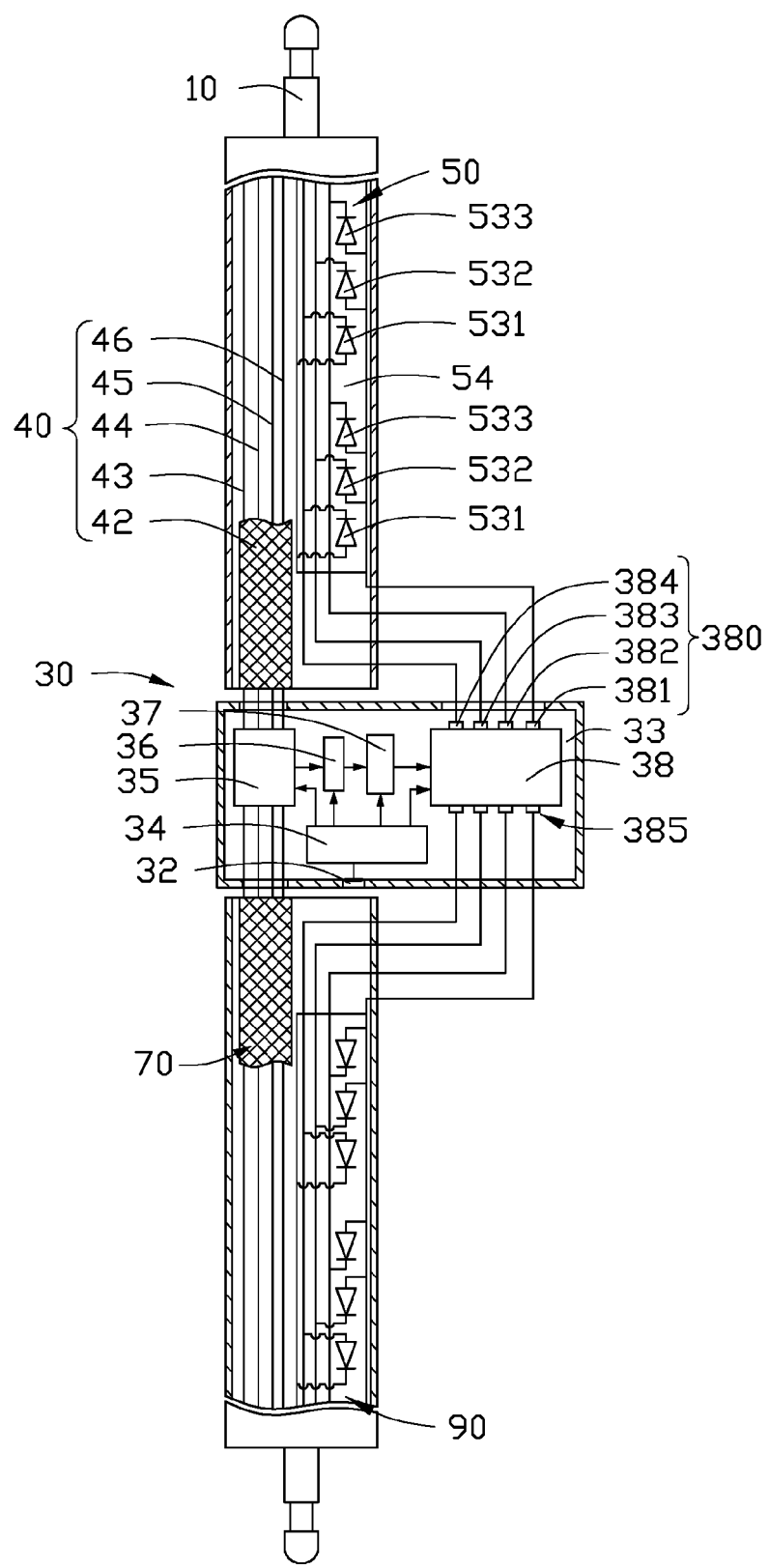
FIG. 9 is an isometric view of a sixth embodiment of an acousto-optic audio signal cable.

FIG. 9 illustrates a sixth embodiment of an acousto-optic audio signal cable 1. The acousto-optic audio signal cable 1 of the sixth embodiment can be similar to the acousto-optic audio signal cable 1 of the fifth embodiment, except that:

In the sixth embodiment, the DC output driver 38 can further include a second group of output terminals 385. A construction of the second group of output terminals 385 can be same as a construction of the first group of output terminals 380, and the detail description of the second group of output terminals 385 can be omitted herein. Corresponding, in the sixth embodiment, in at least one embodiment, the acousto-optic audio signal cable 1 can further include a second light emitting diode marquee light wire 90. A construction of the second light emitting diode marquee light wire 90 can be same as a construction of the first light emitting diode marquee light wire 50 as shown in FIG. 1 of the first embodiment, and the detail description of the second light emitting diode marquee light wire 90 can be omitted herein. The second light emitting diode marquee light wire 90 can be coupled to the second group of output terminals 385 the same as the first light emitting diode marquee light wire 50 coupling to the first group of output terminals 380. The second light emitting diode marquee light wire 90 can be parallel with the second audio wire cluster 70, and the second light emitting diode marquee light wire 90 and the second audio wire cluster 70 can be wrapped in the second transparent or light-transmitting insulating layer 80. Thus, a length of the acousto-optic audio signal cable 1 can be long, and can be used in a scene that a distance between the sound device and the sound amplifying device is long. Furthermore, the acousto-optic controller 30 can be coupled between the first audio wire cluster 40 and the second audio wire cluster 70, thus the acousto-optic audio signal cable 1 can be light evenly.

In an alternative embodiment, the number of the first light emitting diode marquee light wires 50 and the number of the second light emitting diode marquee light wires 80 can be respectively two. The first light emitting diode marquee light wires 50 can be arranged at opposite sides of the first audio wire cluster 40 and the second light emitting diode marquee light wires 80 can be arranged at opposite sides of the second audio wire cluster 70.

In the other embodiments, the number of the first light emitting diode marquee light wires 50 and the number of the second light emitting diode marquee light wires 80 can be respectively three or more than three. The first light emitting diode marquee light wires 50 can be arranged around the first audio wire cluster 40 and the second Light emitting diode marquee light wire 90 can be arranged around the second audio wire cluster 70.

Figure 10:
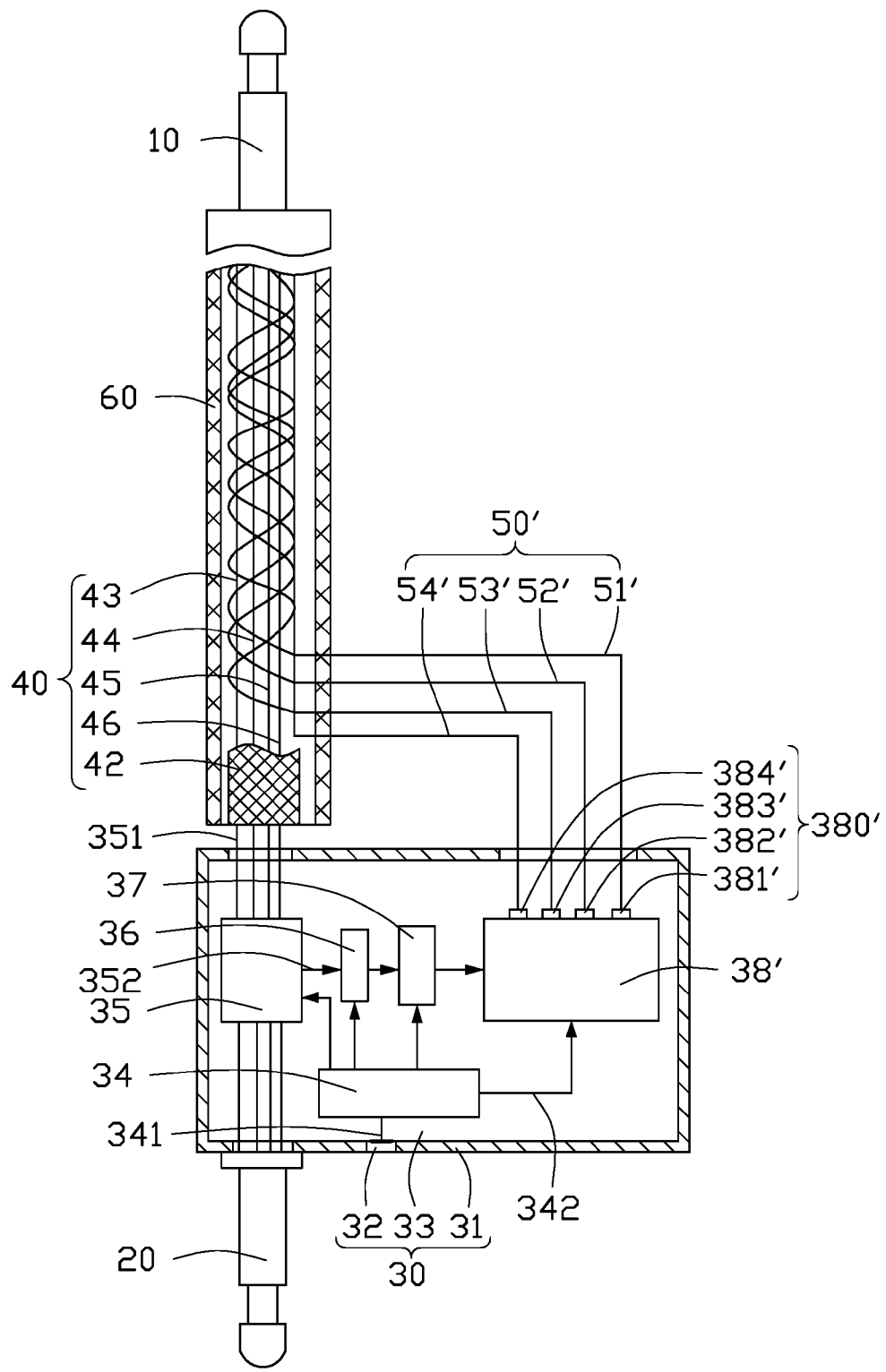
FIG. 10 is an isometric view of a seventh embodiment of an acousto-optic audio signal cable.
Figure 11:
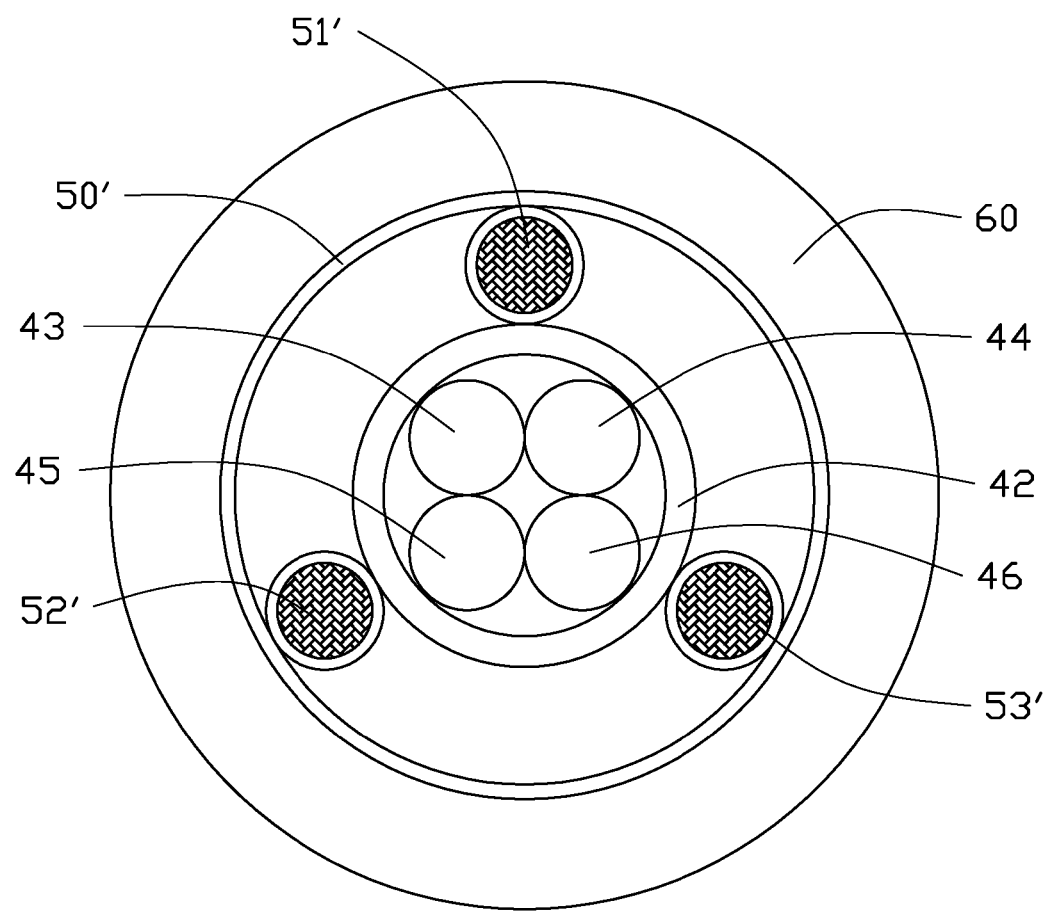
FIG. 11 is a cross-sectional view of the acousto-optic audio signal cable of FIG. 10.

FIGS. 10 and 11 illustrate a seventh embodiment of an acousto-optic audio signal cable 1. The acousto-optic audio signal cable 1 of the seventh embodiment can be similar to the acousto-optic audio signal cable 1 of the first embodiment, except that:

In the seventh embodiment, the acousto-optic audio signal cable 1 can include a first electroluminescent cable 50' substituting of the first light emitting diode marquee light wire 50 of the first embodiment. The first electroluminescent cable 50' can be wound in a spiral on the outer surface of the first audio wire cluster 40, thereby causing the first audio wire cluster 40 to be arranged on a central axis of the first electroluminescent cable 50'. The first transparent or light-transmitting insulating layer 60 can wrap the first audio wire cluster 40 and the first electroluminescent cable 50'. Corresponding, the acousto-optic controller 30 can be coupled among the first audio wire cluster 40, the first electroluminescent cable 50', and the second terminal 20. The acousto-optic controller 30 can receive audio signal from the first audio wire cluster 40 and drive the first electroluminescent cable 50' to light according to the audio signal received from the first audio wire cluster 40.

In the seventh embodiment, the circuit board 33 can include a three phase alternating output driver 38' substituting of the DC output driver 38 of the first embodiment. Corresponding, the power supply circuit component 34 can be further coupled to the sampling amplifier circuit component 35, the A/D conversion circuit component 36, the microprocessor 37, and the three phase alternating output driver 38' to provide power for the sampling amplifier circuit component 35, the A/D conversion circuit component 36, the microprocessor 37, and the three phase alternating output driver 38'. The three phase alternating output driver 38' can be coupled between the microprocessor 37 and the first electroluminescent cable 50'. In at least one embodiment, the three phase alternating output driver 38' can include a first group of alternating output terminals 380', respectively, a common alternating output terminal 381' and three alternating output terminals 382', 383', 384'.

In at least one embodiment, the first electroluminescent cable 50' can include at least three electroluminescent wires 51', 52', 53' and a common bare wire 54'. Each electroluminescent wire can include a first end and a second end. The first ends of the electroluminescent wires 51', 52', 53' can be respectively coupled to the three alternating output terminals 380' of the three phase alternating output driver 38'. The common bare wire 54' can include a first end and a second end. The first end of the common bare wire 54' can be coupled to the common alternating output terminal 380' of the three phase alternating output driver 38'. The second ends of the electroluminescent wires 51', 52', 53' can contact the second end of the common bare wire 54' and together be wound in a spiral on the outer surface of the first audio wire cluster 40. Thereby, the first audio wire cluster 40 can be arranged at a central axis of the electroluminescent wires 51', 52', 53'.

Herein, electroluminescent wire's construction consists of five major components. A solid-metal wire can be wrapped in a high capacitance value insulating layer. Luminescent can be coated on the insulating layer-wrapped solid-metal wire. An outer ITO conductive coating is evaporated on the luminescent-coated solid-metal wire. A very fine wire or pair of wires is parallel with or spiral-wound around the ITO conductive coating-evaporated solid-metal wire. Thus, the electroluminescent wire can be formed. When an alternating current electric from the external power source is applied on the solid-metal wire and the common bare wire, an alternating electric field can be generated to excite the luminescent to emit light.

When the microprocessor 37 controls the three phase alternating output driver 38' to conduct one electroluminescent wire and the common bare wire 54', an alternating electric field can be generated between the one electroluminescent wire and the common bare wire 54' to excite the luminescent of the one electroluminescent wire to emit light. The luminance and rhythm that the electroluminescent wire lights can be controlled via the microprocessor 37 altering the voltage and frequency of the alternating current electric.

In at least one embodiment, the first transparent or light-transmitting insulating layer 60 can wrap the audio wire cluster 40 and the first electroluminescent cable 50'.

To use the acousto-optic audio signal cable 1, the first terminal 10 can be coupled to the sound device, and the second terminal 20 can be coupled to the sound amplifying device. When the sound device speaks, the audio spoke by the sound device can be transmitted to the sound amplifying device via the acousto-optic audio signal cable 1, and then the sound amplifying device can output the audio. And when the sound device speaks, the sampling amplifier circuit component 35 samples the analog audio signal from the acousto-optic audio signal cable 1, and outputs the sampled analog audio signal to the A/D conversion circuit component 36. The A/D conversion circuit component 36 can convert the analog audio signal to the digital audio signal, and output the converted digital audio signal to the microprocessor 37. The microprocessor 37 can output pulse width signal to the three phase alternating output driver 38' to conduct some of the electroluminescent wires 51', 52', 53' and the common bare wire 54', thereby alternating electric fields can be generated between the conductive electroluminescent wires and the conductive common bare wire to excite the luminescent of the conductive electroluminescent wires to emit lights. Thus, the microprocessor 37 can control the three phase alternating output driver 38' to drive the first electroluminescent cable 50' according to the analog audio signal, to produce regular flash of light or produce a flow of light in sequence. Therefore, the acousto-optic audio signal cable 1 can produce a flash effect or a chasing in sequence as running water effect corresponding to each sound in the audio spoke by the sound device, thereby the light effect produced by the acousto-optic audio signal cable 1 corresponding to each sound in the audio can be characterized.

Figure 12:
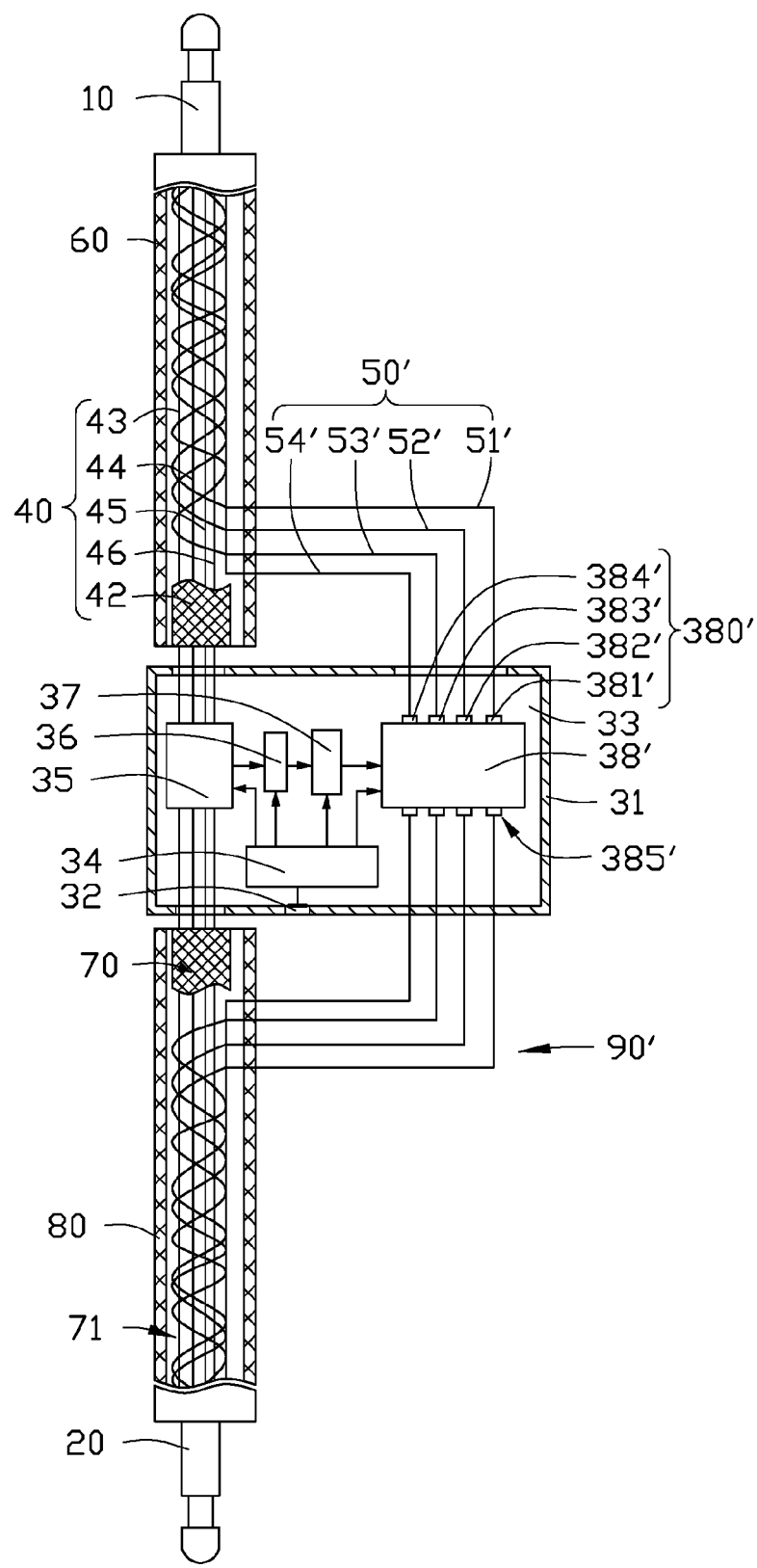
FIG. 12 is similar to FIG. 10, but showing the acousto-optic audio signal cable further comprising a second audio wire cluster.

In an alternative embodiment, as shown in FIG. 12, the acousto-optic audio signal cable 1 can further include a second audio wire cluster 70 and a second transparent or light-transmitting insulating layer 80. The sampling amplifier circuit component 35 can be coupled to the second terminal 20 via the second audio wire cluster 70. In at least one embodiment, the structure of the second audio wire cluster 70 can be the same as the structure of the first audio wire cluster 40. The second audio wire cluster 70 can include a number of second audio wires 71. The second audio wire cluster 70 can be wrapped in the second transparent or light-transmitting insulating layer 80. The second audio wires 71 can be coupled between the sampling amplifier circuit component 35 and the second terminal 20. The second audio wires 71 can be configured to transmit the analog audio signal from the sampling amplifier circuit component 35 to the sound amplifying device via the second terminal 20. Each second audio wire 71 can be coupled to one corresponding first audio wire 41 in the sampling amplifier circuit component 35 or outside the sampling amplifier circuit component 35. Thus, the first audio wire cluster 40 and the second audio wire cluster 70 can transmit the analog audio signal from the sound device to the sound amplifying device via the first terminal 10 and the second terminal 20.

The three phase alternating output driver 38' can further include a second group of alternating output terminals 385'. A construction of the second group of the alternating output terminals 385' can be same as a construction of the first group of the alternating output terminals 380', and the detail description of the second group of the alternating output terminals 385' can be omitted herein. Corresponding, in the twelfth embodiment, in at least one embodiment, the acousto-optic audio signal cable 1 can further include a second electroluminescent cable 90'. A construction of the second electroluminescent cable 90' can be same as a construction of the first electroluminescent cable 50' as shown in eighth embodiment, and the detail description of the second electroluminescent cable 90' can be omitted herein. The second electroluminescent cable 90' can be coupled to the second group of the alternating output terminals 385'. The second electroluminescent cable 90' and the second audio wire cluster 70 can be wrapped in the second transparent or light-transmitting insulating layer 80. Thus, a light area of the audible and visible audio signal cable 1 can be larger, and the light emitted by the audible and visible audio signal cable 1 to be more beautiful.

Figure 13:
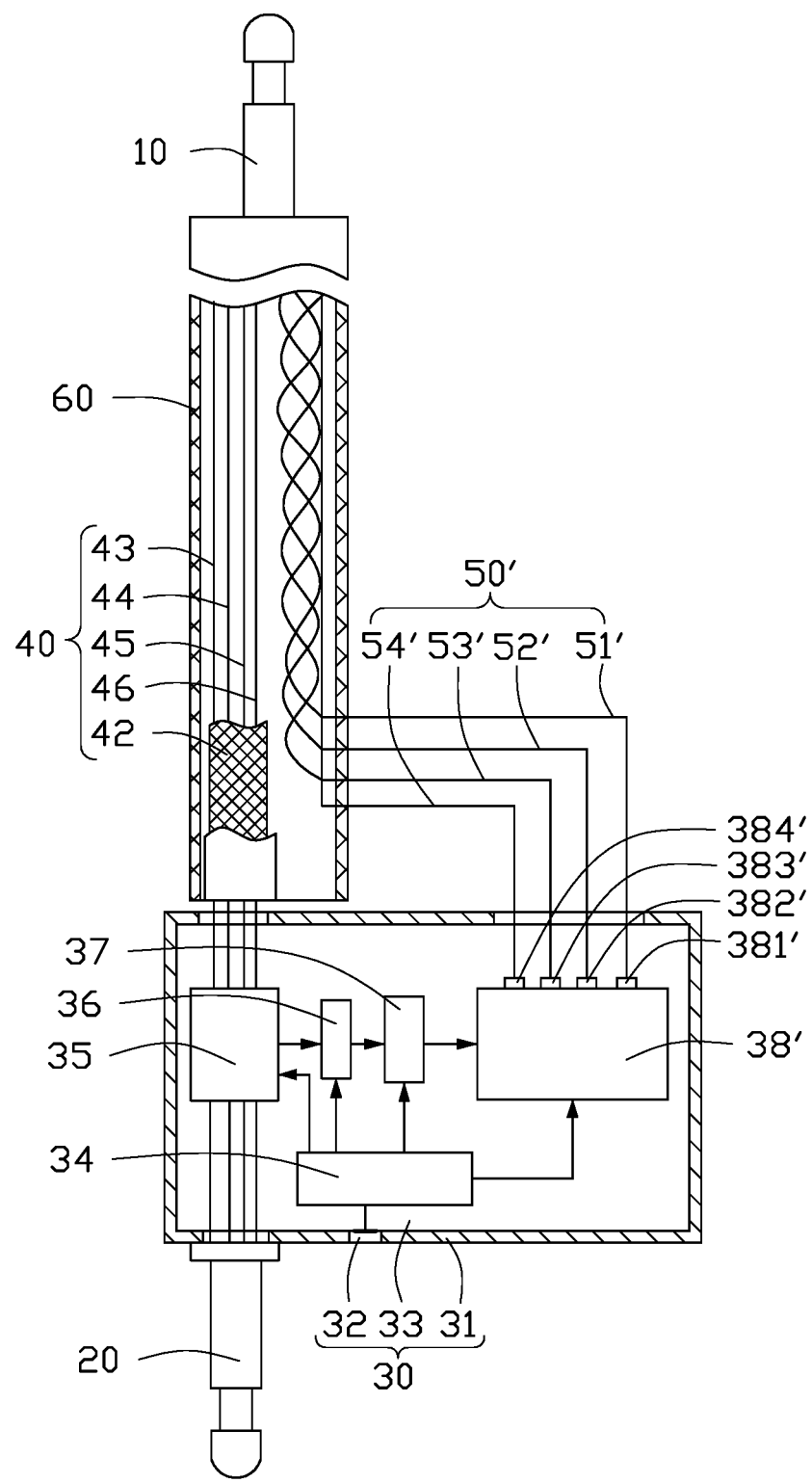
FIG. 13 is an isometric view of an eighth embodiment of an acousto-optic audio signal cable.

FIG. 13 illustrates an eighth embodiment of an acousto-optic audio signal cable 1. The acousto-optic audio signal cable 1 of the eighth embodiment can be similar to the acousto-optic audio signal cable 1 of the seventh embodiment, except that:

In the eighth embodiment, the first electroluminescent cable 50' can be spaced from the first audio wire cluster 40, but not be wound on the first audio wire cluster 40 as shown in the seventh embodiment. In the eighth embodiment, the second end of the electroluminescent wires 51', 52', 53' can be wound with each other in a spiral and contact the second end of the common bare wire 54'. The first electroluminescent cable 50' can be parallelly arranged on a side of the audio wire cluster 40.

Figure 14:
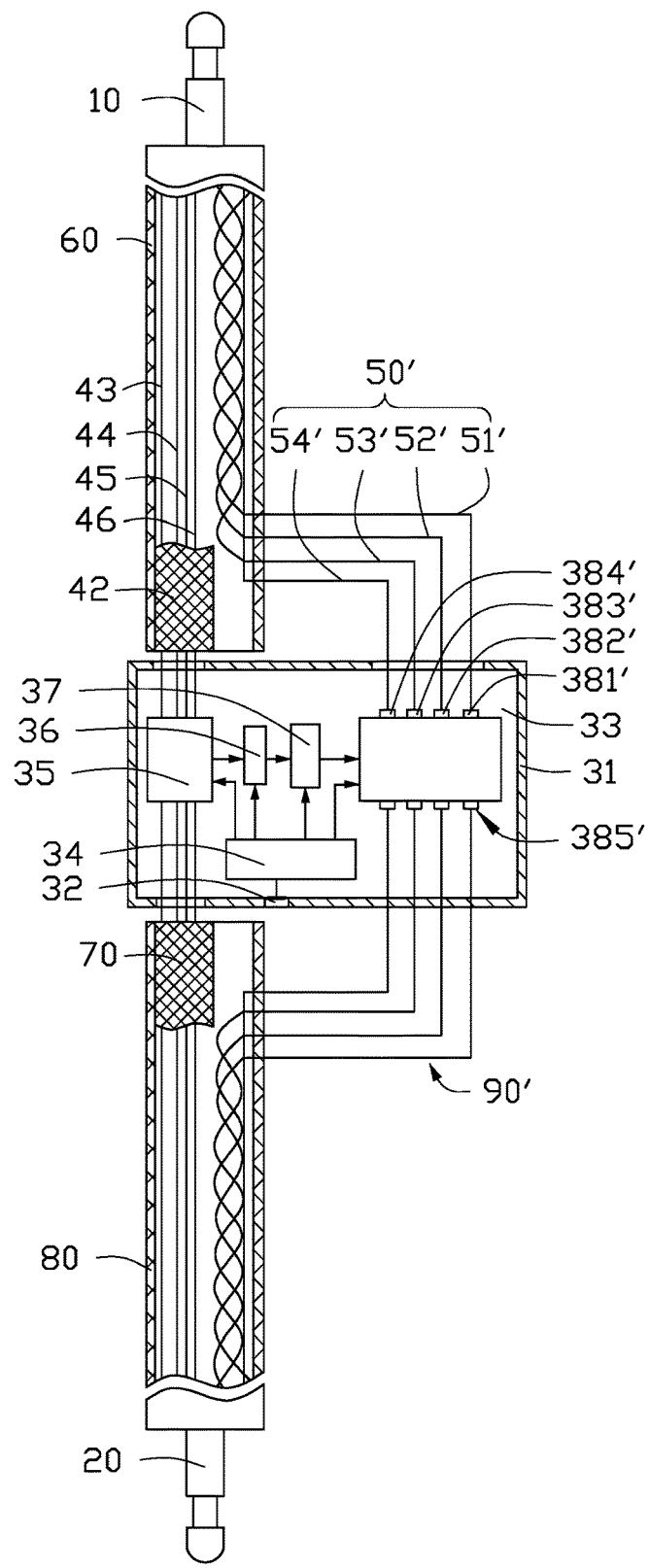
FIG. 14 is similar to FIG. 13, but showing the acousto-optic audio signal cable further comprising a second audio wire cluster.

In an alternative embodiment, as shown in FIG. 14, the first electroluminescent cable 50' can be spaced from the first audio wire cluster 40 and the second electroluminescent cable 90' can be spaced from the second audio wire cluster 70'. In the eighth embodiment, the second end of the electroluminescent wires 51', 52', 53' can be wound with each other in a spiral and contact the second end of the common bare wire 54'. The first electroluminescent cable 50' can be parallelly arranged on a side of the first audio wire cluster 40. An arrangement between the second electroluminescent cable 90' and the second audio wire cluster 80 can be same as an arrangement between the first electroluminescent cable 50' and the first audio wire cluster 40.

Figure 15:
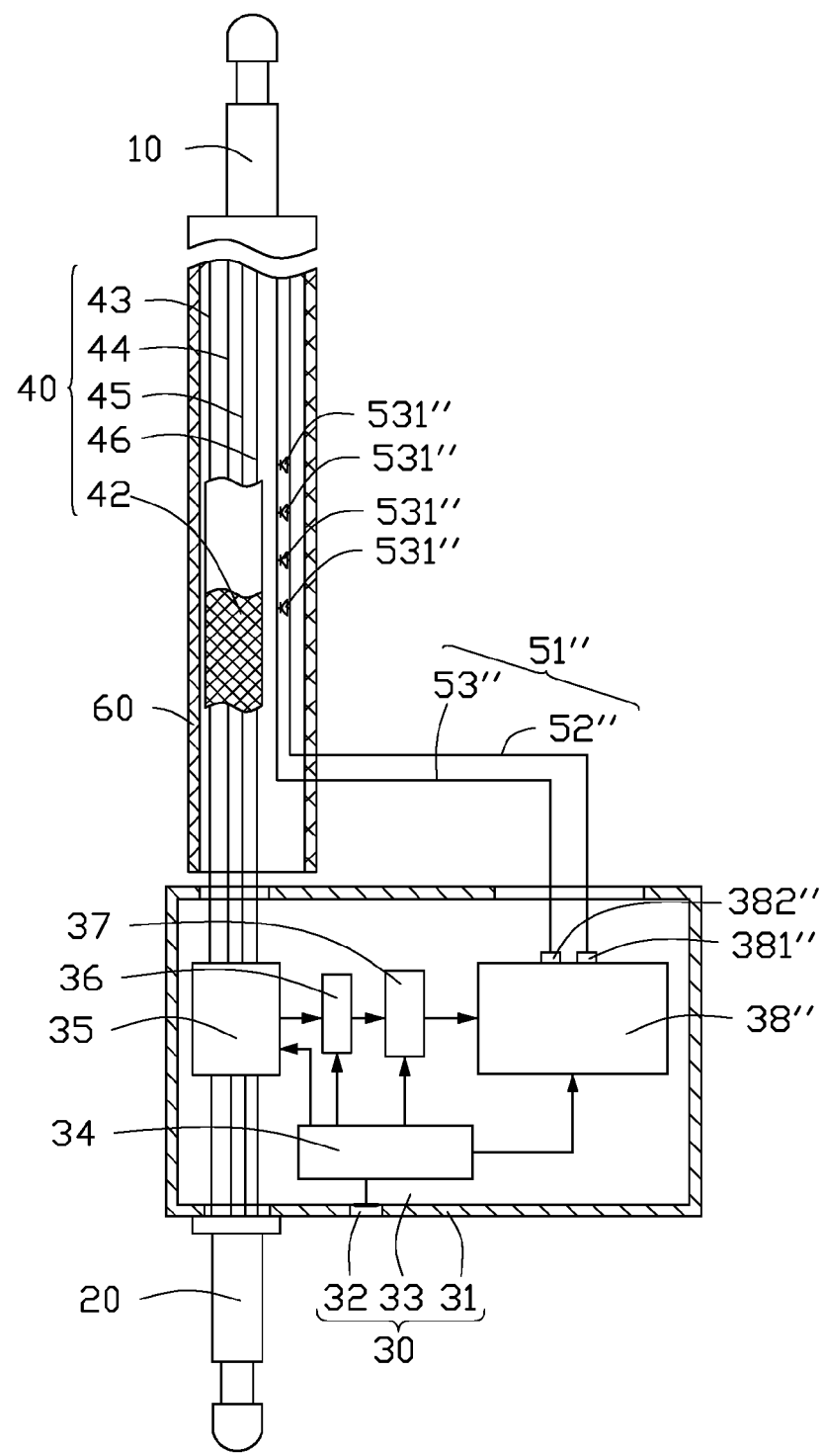
FIG. 15 is an isometric view of a ninth embodiment of an acousto-optic audio signal cable.
Figure 16:
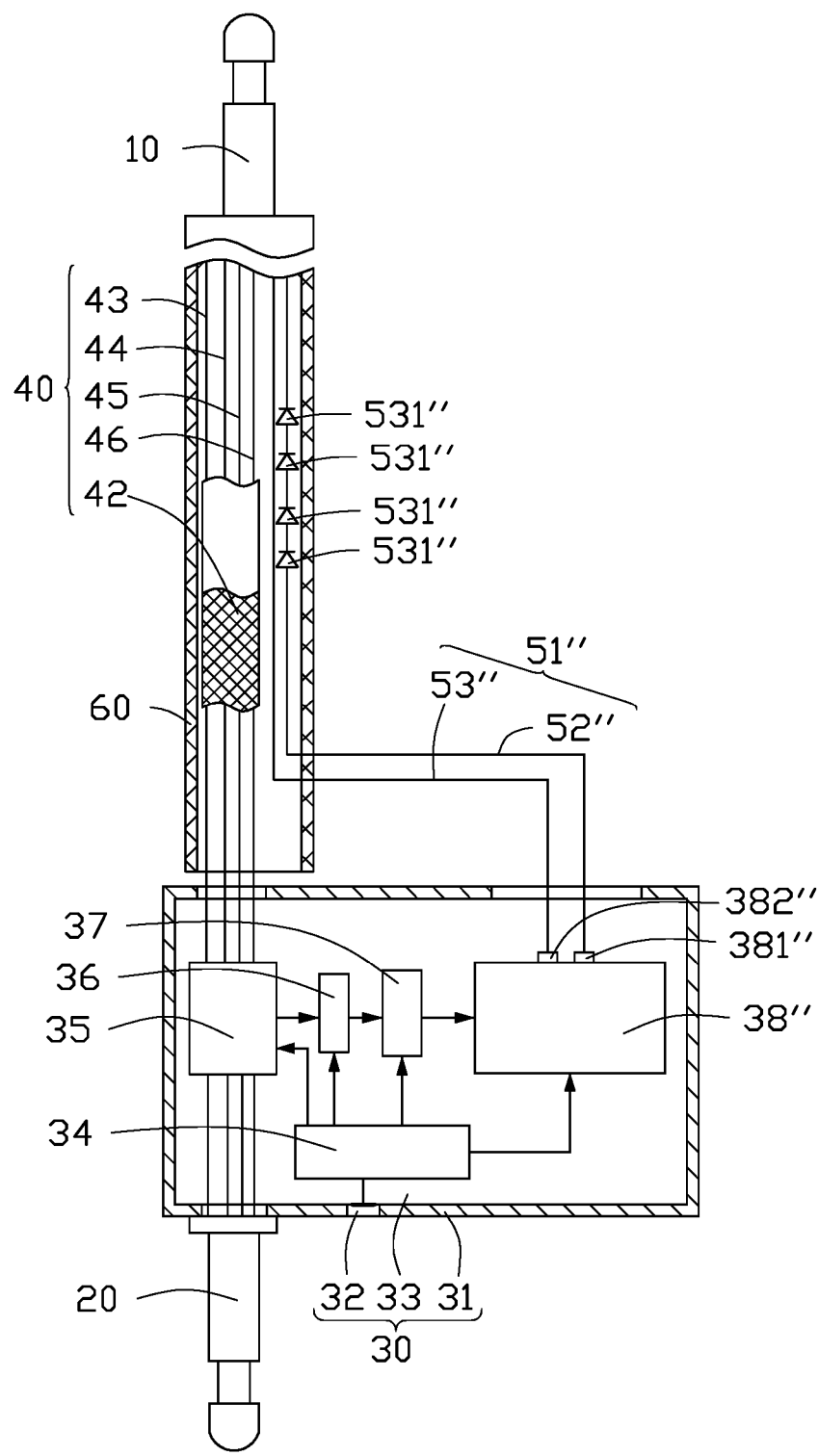
FIG. 16 is similar to FIG. 15, but showing a group of surface mount light emitting diodes in series.

FIGS. 15-16 illustrate a ninth embodiment of an acousto-optic audio signal cable 1. The acousto-optic audio signal cable 1 of the ninth embodiment can be similar to the acousto-optic audio signal cable 1 of the first embodiment, except that:

In the ninth embodiment, two copper wires 51", respectively a positive copper wire 52" and a negative copper wire 53", and a group of surface mount light emitting diodes 531" conductively attached between the positive copper wire 52" and the negative copper wire 53" can form a light emitting diodes light-emitting light string 50", replacing the light emitting diodes marquee light wire 50. Corresponding, the DC positive output terminal 381 of the DC output driver 38 can be replaced by the positive output terminal 381" of the output driver 38", and the three DC negative output terminals 382, 383, 384 of the DC output driver 38 can be replaced by one negative output terminal 382" of the output driver 38". The positive copper wire 52" can be coupled to the positive output terminal 381", and the negative copper wire 53" can be coupled to the negative output terminal 382". The surface mount light emitting diodes 531" can be connected in series or in parallel. In detail, the surface mount light emitting diodes 531" can be soldered between the positive copper wire 52" and the negative copper wire 53" at preset distance and at preset direction, to form a parallel light emitting diodes light-emitting light string. In an alternative embodiment, as shown in FIG. 15, the positive copper wire 52" can be divided into a number of sub-positive copper wires. Each surface mount light emitting diode 531" can be arranged between and coupled to corresponding two adjacent sub-positive copper wires. Thus, a serial light emitting diodes light-emitting light string can be formed. The serial light emitting diode light wire can be driven by an alternative current to light.

The light emitting diodes light-emitting light string 50" can produce a light in constant effect or a light in flash effect. The light emitting diodes light-emitting light string 50" can be parallelly arranged at a side of the first audio wire cluster 40. The first transparent or light-transmitting insulating layer 60 can wrap the audio wire cluster 40 and the light emitting diodes light-emitting light string 50" and form an outer surface of the acousto-optic audio signal cable 1. In the ninth embodiment, a cross-section of the acousto-optic audio signal cable 1 can be circular, flat, or elliptical. In the embodiment, the audible and visible audio signal cable 1 can produce a flash of light. The audible and visible audio signal cable can be controlled by the microprocessor to light in flash in time to music, and the luminance of the light in flash can be varied as the rhythm various of music, produce a strong dynamic property.

Figure 17:
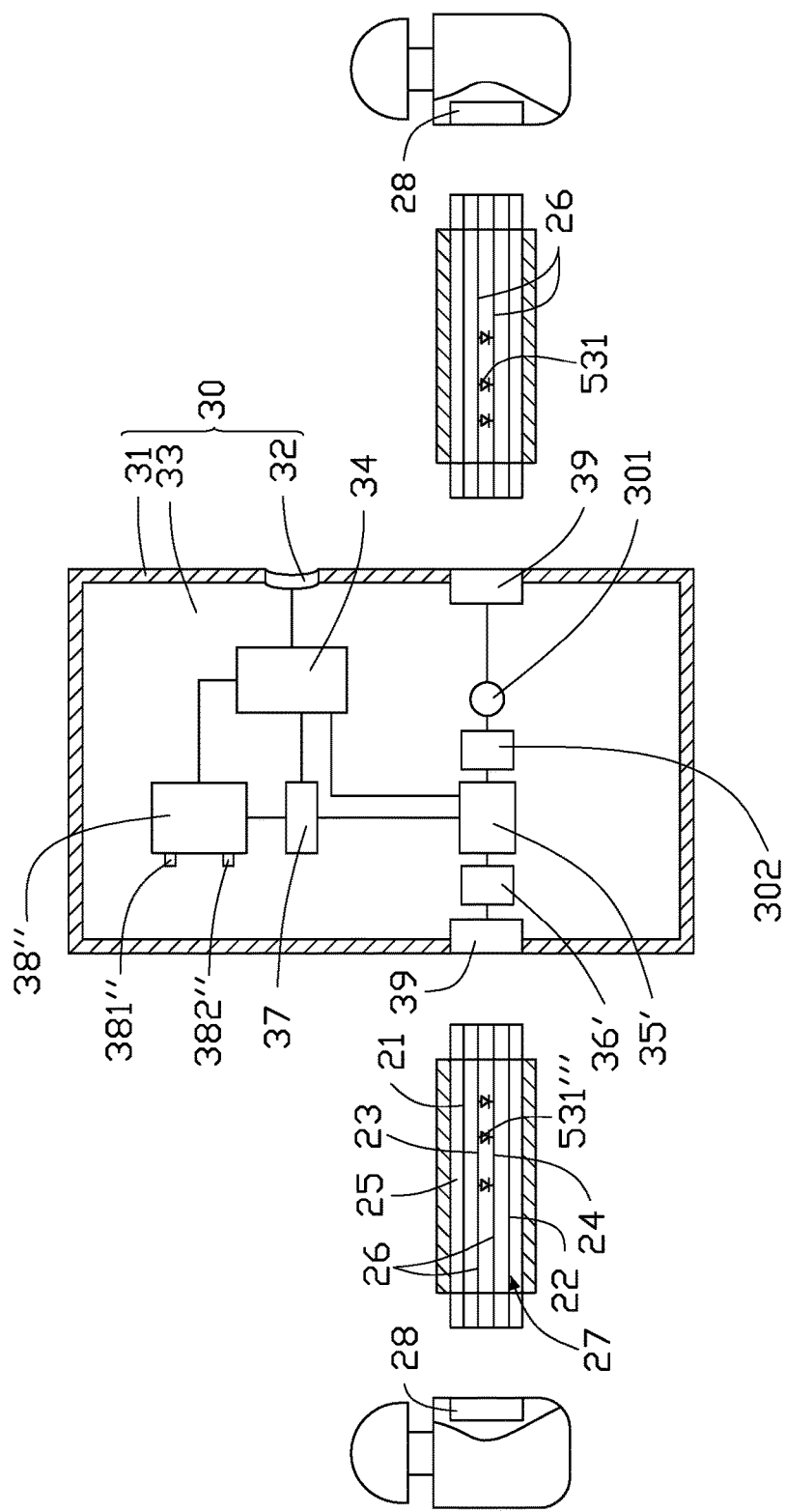
FIG. 17 is an isometric view of a tenth embodiment of an acousto-optic audio signal cable.

FIG. 17 illustrates a tenth embodiment of an acousto-optic audio signal cable 1. The acousto-optic audio signal cable 1 of the tenth embodiment can be similar to the acousto-optic audio signal cable 1 of the ninth embodiment of FIG. 15, except that:

In the tenth embodiment, the acousto-optic audio signal cable 1 can include a group of surface mount light emitting diodes 531''', a signal conductor 21, a signal ground 22, a light emitting diode light-emitting light string positive wire 23, a light emitting diode light-emitting light string negative wire 24, and a flexible printed circuit board 25. The surface mount light emitting diodes 531''' conductively attached between the light emitting diode light-emitting light string positive wire 23 and the light emitting diode light-emitting light string negative wire 24 can form a light emitting diode light-emitting light string 26. The signal conductor 21 and the signal ground 22 can cooperatively form an audio wire cluster 27. The signal conductor 21, the signal ground 22, the light emitting diode light-emitting light string positive wire 23, and the light emitting diode light-emitting light string negative wire 24 can be printed on the flexible printed circuit board 25. The signal conductor 21 and the signal ground 22 can transmit the audio signal. In at least one embodiment, two groups of plug-in conductive strips 11, 12, 13, 14 can be respectively arranged at two ends of the flexible printed circuit board. The plug-in conductive strips 11, 12, 13, 14 can be parallel with each other. The plug-in conductive strips 11, 12, 13, 14 can be respectively coupled to the signal conductor 21, the signal ground 22, the light emitting diode light-emitting light string positive wire 23, and the light emitting diode light-emitting light string negative wire 24. In at least one embodiment, the plug-in conductive strips 11, 12, 13, 14 can be directly plugged in the acousto-optic controller 30 and a first external device 28, such as an earphone. Thus, the connection between the circuit board 33 and the first external device 28 can be established. The audio signal can be transmitted from the acousto-optic controller 30 to the first external device 28. The acousto-optic controller 30 can further control the light emitting diode light-emitting light string 26 to light in a flash in time to music.

The acousto-optic controller 30 can include a plug 39 in the housing coupled with the plug-in conductive strips 11, 12, 13, 14. The acousto-optic controller 30 can further include a bluetooth transmit-receive circuit 35' replacing the sampling amplifier circuit 35, and a D/A conversion circuit component 36' replacing the A/D conversion circuit component 36. The D/A conversion circuit component 36' can be arranged between the bluetooth transmit-receive circuit 35' and the plug 39. The bluetooth transmit-receive circuit 35' can be coupled to the microprocessor 37. Thus, the bluetooth transmit-receive circuit 35' can wirelessly receive digital audio data from a second external device 28, such as a mobile phone. The D/A conversion circuit component 36' can convert the digital audio data from the second external device 28 to an analog audio signal, and output the analog audio signal to the first external device 28 to play. In at least one embodiment, the positive output terminal 381" of the output driver 38" and the negative output terminal 382" of the output driver 38" can be coupled to the plug 39. Thus, the digital audio signal from the second external device 28 can be transmitted to the microprocessor 37. The microprocessor 37 can control the output driver 38" to drive the light emitting diode light-emitting light string 26 to light. The luminance and rhythm that the light emitting diode light-emitting light string 26 lights can be controlled according to the sound and rhythm of the audio signal. In at least one embodiment, the acousto-optic controller 30 can further include a microphone 301 and a A/D conversion circuit component 302. The microphone 301 can receive analog audio signal. The A/D conversion circuit component 302 can be coupled between the microphone 301 and the bluetooth transmit-receive circuit 35'. The A/D conversion circuit component 302 can convert the analog audio signal to the digital audio signal, and output the digital audio signal to the bluetooth transmit-receive circuit 35'. The bluetooth transmit-receive circuit 35' can transmit the digital audio signal to the first external device 28 via Bluetooth®.

In at least one embodiment, the acousto-optic audio signal cable 1 can further include a transparent or light-transmitting insulating layer 29. The transparent or light-emitting insulating layer 29 can wrap the light emitting diode light-emitting light string 26, the signal conductor 21, the signal ground 22, and the flexible printed circuit board 25.

In an alternative embodiment, the number of the light emitting diode light-emitting light string 26 can be three or more to form a light emitting diode marquee light wire.

Figure 18:
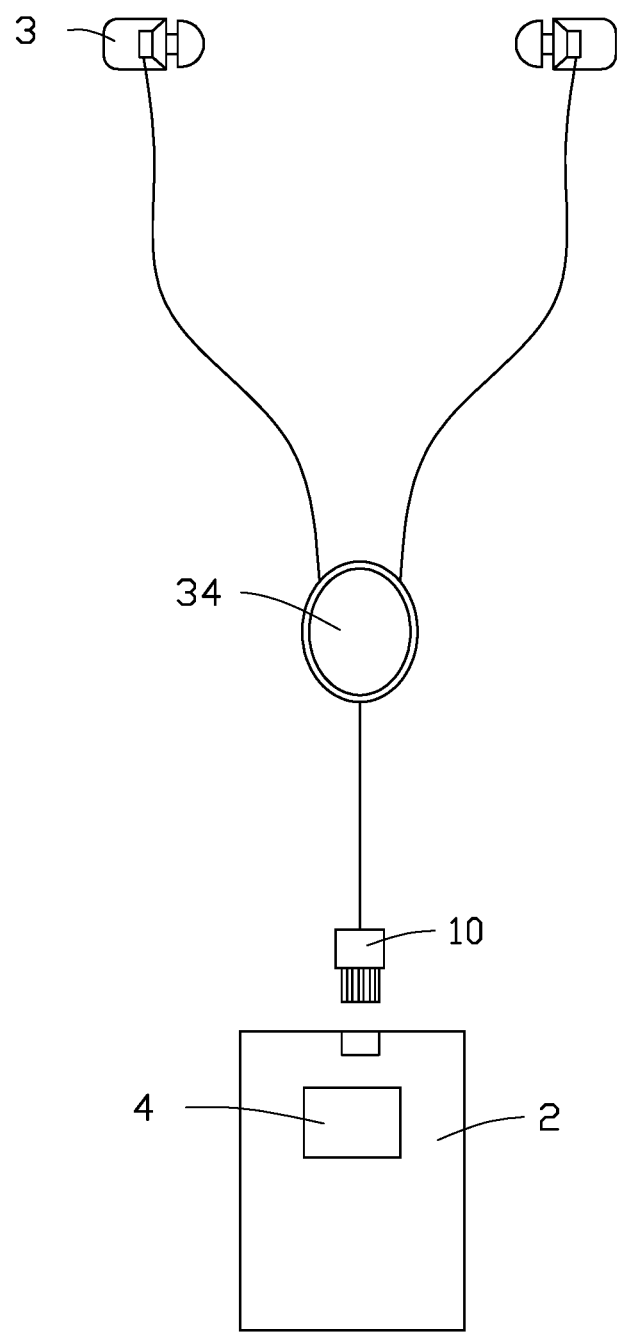
FIG. 18 is an isometric view of an embodiment of the acousto-optic audio signal cable coupled to a mobile phone and an earphone.
Figure 19:
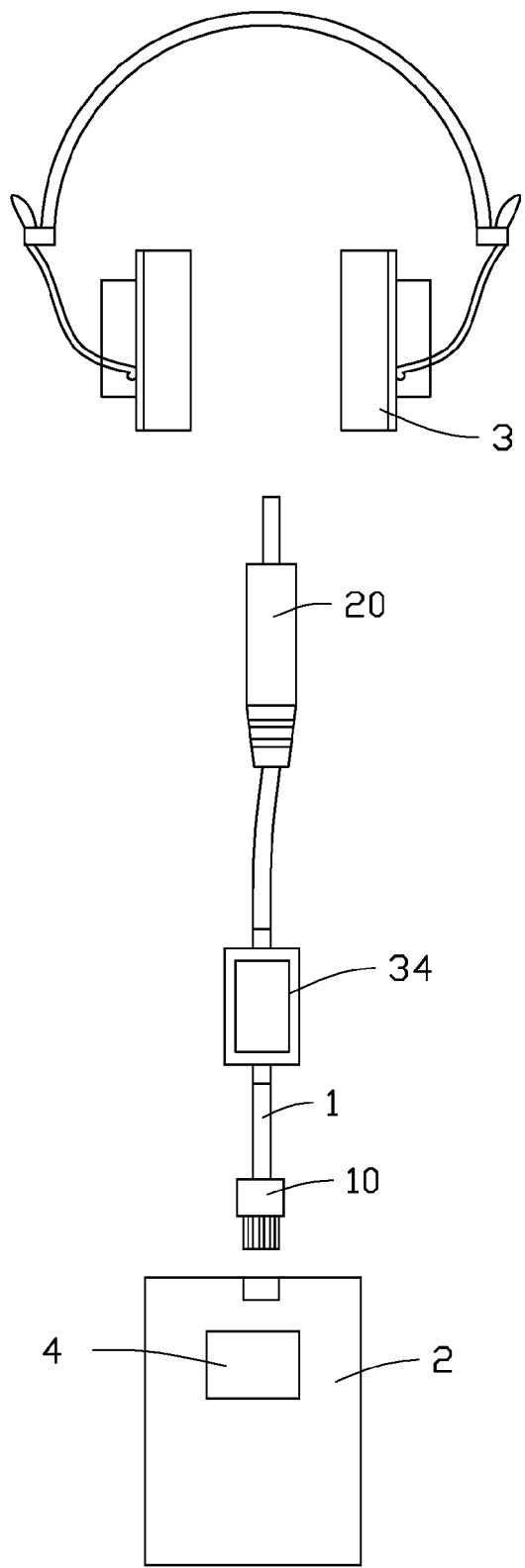
FIG. 19 is similar to FIG. 18, but showing the acousto-optic audio signal cable coupled to the earphone via a terminal.

FIGS. 18-19 show the acousto-optic audio signal cable coupled to a mobile phone and an earphone. The acousto-optic audio signal cable 1 can include a first end and a second end. The first end of the acousto-optic audio signal cable 1 can be coupled to the mobile phone 2, and the second end of the acousto-optic audio signal cable can be coupled to the earphone 3. Thus, the sound from the mobile phone 2 can be transmitted to the earphone 3 via the acousto-optic audio signal cable 1 and can be output by the earphone 3. The acousto-optic audio signal cable 1 can give illumination. In at least one embodiment, the acousto-optic audio signal cable 1 can be coupled to the mobile phone 2 via a first terminal 10, such as a lightning connector or a type-C connector, and can be coupled to the earphone 3 directly or via a second terminal 20. In at least one embodiment, the acousto-optic audio signal cable 1 can be further coupled to a battery 4 of the mobile phone 2. The power supply circuit component 34 can be coupled to the battery 4 of the mobile phone 2 and obtain power from the battery 4 of the mobile phone 2. Thus, the storage battery, the battery circuit, and the power connector can be omitted herein, the size of the acousto-optic controller can be small, and the appearance can be more attractive.

Herein, the PCB can be an important electrical component of an electronic device. The PCB can mechanically support and electrically connect other electronic components.

Herein, the light emitting diode marquee light wire, the electroluminescent cable, and the electroluminescent wire can be specific product of the light wire. However, the light wire can be not limited to the light emitting diode marquee light wire, the electroluminescent cable, and the electroluminescent wire. The light wire can receive the signal from the acousto-optic controller and be controlled to light by the acousto-optic controller.

Herein, the DC output driver and the three phase alternating output driver can be specific products of the output driver. However, the output driver can be not limited to the DC output driver and the three phase alternating output driver. The output driver can receive the signal from the microprocessor to drive the light wire to light.

Herein, the light emitting diode marquee light wire can be not only applied on the guitar cable, the microphone cable, or the speaker cable, but also can be applied on other cable, for example, festival lamp sets, advertisement lamp sets, or decorative lamp sets.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An acousto-optic audio signal cable comprising:
at least one audio wire cluster;

at least one light emitting diode marquee light wire, at least one light emitting diodes light-emitting light string, or at least one electroluminescent cable, the at least one light emitting diode marquee light wire, the at least one light emitting diodes light-emitting light string, or the at least one electroluminescent cable being parallelly arranged at a side of the at least one audio wire cluster, or the at least one light emitting diode marquee light wire, the at least one light emitting diodes light-emitting light string, or the at least one electroluminescent cable being wound in a spiral on an outer surface of the at least one audio wire cluster;

a transparent or light-transmitting insulating layer, the transparent or light-transmitting insulating layer wrapping the integrated wire cluster; and an acousto-optic controller comprising a circuit board, the circuit board comprising:
  a sampling amplifier circuit component, the sampling amplifier circuit component comprising an input terminal, the input terminal of the sampling amplifier circuit component being coupled to the audio wire cluster;
  an A/D conversion circuit component;
  a microprocessor; and
  an output driver being coupled to the at least one light emitting diode marquee light wire or the at least one light emitting diode light-emitting light string, wherein the sampling amplifier circuit component, the A/D conversion circuit component, the microprocessor, and the output driver are coupled in sequence.

2. The acousto-optic audio signal cable of claim 1, wherein:
the at least one light emitting diode marquee light wire is made of at least three light emitting diode light-emitting light strings parallel with each other, wound in a spiral and space from the at least one audio wire cluster, or wound in a spiral on an outer surface of the at least one audio wire cluster.

3. The acousto-optic audio signal cable of claim 1, wherein:
the light emitting diode marquee light wire comprises:
  two or three positive copper wires, each positive copper wire comprises a first end and a second end, the first ends of the positive copper wires are respectively coupled to positive output terminals of the output driver, and the second ends of the positive copper wires extend along the audio wire cluster;
  three negative copper wires, each negative copper wire comprises a first end and a second end, the first ends of the negative copper wires are respectively coupled to negative output terminals of the output driver, and the second ends of the negative copper wires extend along the audio wire cluster, the two or three positive copper wires and the three negative copper wires are arranged on one or more sides of the acousto-optic audio signal cable; and
  a plurality of groups of surface mount light emitting diodes, each group of surface mount light emitting diodes comprises at least three surface mount light emitting diodes; a plurality of groups of surface mount light emitting diodes are conductively attached between adjacent positive copper wire and negative copper wire at preset distance and preset direction;
wherein one positive copper wire and one adjacent negative copper wire form a loop with one group of surface mount light emitting diodes conductively attached between adjacent positive copper wire and negative copper wire, or one positive copper wire and two negative copper wires arranged at opposite sides of the one positive copper wire form loops with two groups of surface mount light emitting diodes respectively conductively attached between corresponding adjacent positive copper wire and negative copper wire.

4. The acousto-optic audio signal cable of claim 1, wherein the light emitting diode marquee light wire comprises a plurality of surface mount light emitting diodes and a flexible printed circuit board, the surface mount light emitting diodes are serially or parallelly mounted at the flexible printed circuit board, the light emitting diode marquee light wire is coupled to the output terminals of the output driver.

5. The acousto-optic audio signal cable of claim 1, wherein:
the acousto-optic controller further comprises a housing and a power connector, the power connector is embedded in the housing, the circuit board is fixed in the housing, the circuit board further comprises a power supply circuit component, the power supply circuit component comprises an input terminal and an output terminal, the input terminal of the power supply circuit component is coupled to the power connector, and the output terminal of the power supply circuit component is coupled to the sampling amplifier circuit component, the A/D conversion circuit component, the microprocessor, and the output driver respectively.

6. The acousto-optic audio signal cable of claim 1, wherein:
the acousto-optic controller is arranged in middle or an end of the acousto-optic audio signal cable, two ends of the acousto-optic audio signal cable are respectively coupled to a sound device and a sound amplifying device via a first terminal and a second terminal or respectively directly coupled to the sound device and the sound amplifying device without the first terminal and the second terminal.

7. The acousto-optic audio signal cable of claim 1, wherein:
the acousto-optic audio signal cable further comprises a plurality of insulating layers, a plurality of metal woven mesh shield layers, or a plurality of aluminum foil shield layers arranged between the at least one light emitting diode marquee light wire and the audio wire cluster, at least one light emitting diodes light-emitting light string and the audio wire cluster, or at least one electroluminescent cable and the audio wire cluster.

8. The acousto-optic audio signal cable of claim 1, wherein:
each light emitting diode light-emitting light string comprises:
  a positive copper wire, a first end of the positive copper wire being coupled to a positive output terminal of the output driver, and a second end of the positive copper wire extending along the at least one audio wire cluster;
  a negative copper wire, a first end of the negative copper wire being coupled to a negative output terminal of the output driver, and a second end of the negative copper wire extending along the at least one audio wire cluster
  a group of surface mount light emitting diodes, the positive copper wire and the negative copper wire form a loop with the group of surface mount light emitting diodes parallelly conductively attached between the positive copper wire and the negative copper wire.

9. The acousto-optic audio signal cable of claim 1, wherein:
each light emitting diode light-emitting light string comprises:
a positive copper wire, a first end of the positive copper wire being coupled to a positive output terminal of the output driver, and a second end of the positive copper wire extending along the at least one audio wire cluster;
a negative copper wire, a first end of the negative copper wire being coupled to a negative output terminal of the output driver, and a second end of the negative copper wire extending along the at least one audio wire cluster
a group of surface mount light emitting diodes, the positive copper wire and the negative copper wire form a loop with the group of surface mount light emitting diodes serially conductively attached between the positive copper wire and the negative copper wire.

10. The acousto-optic audio signal cable of claim 9, wherein:
the positive copper wire is divided into a plurality of sub-positive copper wires, each surface mount light emitting diode is arranged between and coupled to corresponding two adjacent sub-positive copper wires.

11. An acousto-optic audio signal cable comprising:
at least one audio wire cluster;
at least one light emitting diode marquee light wire or at least one light emitting diodes light-emitting light string, the at least one light emitting diode marquee light wire or the at least one light emitting diodes light-emitting light string being parallelly arranged at a side of the at least one audio wire cluster, or the at least one light emitting diode marquee light wire or the at least one light emitting diodes light-emitting light string being wound in a spiral on an outer surface of the at least one audio wire cluster;
a transparent or light-transmitting insulating layer, the transparent or light-transmitting insulating layer wrapping the integrated wire cluster; and
an acousto-optic controller comprising a circuit board, the circuit board comprising:
a bluetooth transmit-receive circuit;
a D/A conversion circuit component coupled between the bluetooth transmit-receive circuit and the audio wire cluster;
a microprocessor; and
an output driver being coupled to the at least one light emitting diode marquee light wire or the at least one light emitting diode light-emitting light string, wherein the bluetooth transmit-receive circuit, the microprocessor, and the output driver are coupled in sequence.

12. The acousto-optic audio signal cable of claim 11, wherein:
the at least one light emitting diode marquee light wire is made of at least three light emitting diode light-emitting light strings parallel with each other, wound in a spiral and space from the at least one audio wire cluster, or wound in a spiral on an outer surface of the at least one audio wire cluster.

13. The acousto-optic audio signal cable of claim 11, wherein:
the light emitting diode marquee light wire comprises:
two or three positive copper wires, each positive copper wire comprises a first end and a second end, the first ends of the positive copper wires are respectively coupled to positive output terminals of the output driver, and the second ends of the positive copper wires extend along the audio wire cluster;
three negative copper wires, each negative copper wire comprises a first end and a second end, the first ends of the negative copper wires are respectively coupled to negative output terminals of the output driver, and the second ends of the negative copper wires extend along the audio wire cluster, the two or three positive copper wires and the three negative copper wires are arranged on one or more sides of the acousto-optic audio signal cable; and
a plurality of groups of surface mount light emitting diodes, each group of surface mount light emitting diodes comprises at least three surface mount light emitting diodes; a plurality of groups of surface mount light emitting diodes are conductively attached between adjacent positive copper wire and negative copper wire at preset distance and preset direction;
wherein one positive copper wire and one adjacent negative copper wire form a loop with one group of surface mount light emitting diodes conductively attached between adjacent positive copper wire and negative copper wire, or one positive copper wire and two negative copper wires arranged at opposite sides of the one positive copper wire form loops with two groups of surface mount light emitting diodes respectively conductively attached between corresponding adjacent positive copper wire and negative copper wire.

14. The acousto-optic audio signal cable of claim 11, wherein the light emitting diode marquee light wire comprises a plurality of surface mount light emitting diodes and a flexible printed circuit board, the surface mount light emitting diodes are serially or parallelly mounted at the flexible printed circuit board, the light emitting diode marquee light wire is coupled to the output terminals of the output driver.

15. The acousto-optic audio signal cable of claim 11, wherein:
the acousto-optic controller further comprises a housing and a power connector, the power connector is embedded in the housing, the circuit board is fixed in the housing, the circuit board further comprises a power supply circuit component, the power supply circuit component comprises an input terminal and an output terminal, the input terminal of the power supply circuit component is coupled to the power connector, and the output terminal of the power supply circuit component is coupled to the bluetooth transmit-receive circuit, the D/A conversion circuit component, the microprocessor, and the output driver respectively.

16. The acousto-optic audio signal cable of claim 11, wherein:
the acousto-optic audio signal cable further comprises a plurality of insulating layers, a plurality of metal woven mesh shield layers, or a plurality of aluminum foil shield layers arranged between the at least one light emitting diode marquee light wire and the audio wire cluster, at least one light emitting diodes light-emitting light string and the audio wire cluster, or at least one electroluminescent cable and the audio wire cluster.

17. The acousto-optic audio signal cable of claim 11, wherein:
- each light emitting diode light-emitting light string comprises:
  - a positive copper wire, a first end of the positive copper wire being coupled to a positive output terminal of the output driver, and a second end of the positive copper wire extending along the at least one audio wire cluster;
  - a negative copper wire, a first end of the negative copper wire being coupled to a negative output terminal of the output driver, and a second end of the negative copper wire extending along the at least one audio wire cluster
  - a group of surface mount light emitting diodes, the positive copper wire and the negative copper wire form a loop with the group of surface mount light emitting diodes parallelly or serially conductively attached between the positive copper wire and the negative copper wire.

18. An acousto-optic audio signal cable comprising:
- at least one audio wire cluster;
- at least one light emitting diode marquee light wire or at least one light emitting diodes light-emitting light string, the at least one light emitting diode marquee light wire or the at least one light emitting diodes light-emitting light string being parallelly arranged at a side of the at least one audio wire cluster, or the at least one light emitting diode marquee light wire or the at least one light emitting diodes light-emitting light string being wound in a spiral on an outer surface of the at least one audio wire cluster;
- a flexible printed circuit board, the at least one audio wire cluster and the at least one light emitting diode marquee light wire, or the at least one audio wire cluster and the at least one light emitting diodes light-emitting light string being printed on the flexible printed circuit board;
- at least one group of plug-in conductive strips arranged at an end of the flexible printed circuit board, the group of plug-in conductive strips being coupled to the at least one audio wire cluster and at least one light emitting diode marquee light wire or coupled to the at least one audio wire cluster and at least one light emitting diodes light-emitting light string; and
- an acousto-optic controller comprising a plug and a circuit board, the plug being configured to receive the group of plug-in conductive strips, the circuit board comprising:
  - a bluetooth transmit-receive circuit;
  - a D/A conversion circuit component coupled between the bluetooth transmit-receive circuit and the audio wire cluster;
  - a microprocessor; and
  - an output driver being coupled to the at least one light emitting diode marquee light wire or the at least one light emitting diode light-emitting light string via the plug and the group of plug-in conductive strips, wherein the sampling amplifier circuit component, the D/A conversion circuit component, the microprocessor, and the output driver are coupled in sequence.

19. The acousto-optic audio signal cable of claim 18, wherein:
- the acousto-optic controller further comprises a housing and a power connector, the power connector is embedded in the housing, the circuit board is fixed in the housing, the circuit board further comprises a power supply circuit component, the power supply circuit component comprises an input terminal and an output terminal, the input terminal of the power supply circuit component is coupled to the power connector, and the output terminal of the power supply circuit component is coupled to the bluetooth transmit-receive circuit, the D/A conversion circuit component, the microprocessor, and the output driver respectively.

20. The acousto-optic audio signal cable of claim 18, wherein:
- the acousto-optic audio signal cable comprises a terminal, the terminal of the acousto-optic audio signal cable is a lightning connector or a type-C connector, the acousto-optic audio signal cable is further coupled to a battery of an external electronic device via the terminal, thereby the power supply circuit component is coupled to the battery of the external electronic device and obtains power from the battery of the external electronic device.

* * * * *